US012207330B2

(12) United States Patent
Kuo

(10) Patent No.: US 12,207,330 B2
(45) Date of Patent: Jan. 21, 2025

(54) METHOD AND APPARATUS FOR SUPPORTING MULTIPLE CONNECTIVITY SERVICES IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 325 days.

(21) Appl. No.: 17/939,178

(22) Filed: Sep. 7, 2022

(65) Prior Publication Data

US 2023/0076012 A1 Mar. 9, 2023

Related U.S. Application Data

(60) Provisional application No. 63/252,814, filed on Oct. 6, 2021, provisional application No. 63/242,388, filed on Sep. 9, 2021.

(51) Int. Cl.
*H04W 76/15* (2018.01)
*H04W 84/04* (2009.01)
*H04W 88/06* (2009.01)

(52) U.S. Cl.
CPC .......... *H04W 76/15* (2018.02); *H04W 84/047* (2013.01); *H04W 88/06* (2013.01)

(58) Field of Classification Search
CPC ..... H04W 8/005; H04W 4/023; H04W 88/04; H04W 76/14; H04W 76/27; H04W 68/02; H04W 40/22; H04W 12/06
USPC ......................................................... 370/315
See application file for complete search history.

(56) References Cited

U.S. PATENT DOCUMENTS

| | | | | |
|---|---|---|---|---|
| 10,701,549 B2* | 6/2020 | Basu Mallick | ....... | H04W 4/023 |
| 11,259,350 B1* | 2/2022 | Pan | ....... | H04W 88/04 |
| 11,477,831 B2* | 10/2022 | Kim | ....... | H04W 76/14 |
| 11,638,197 B1* | 4/2023 | Pan | ....... | H04W 76/30 |
| | | | | 370/315 |
| 11,665,769 B2* | 5/2023 | Pan | ....... | H04W 76/19 |
| | | | | 455/11.1 |
| 11,903,057 B2* | 2/2024 | Kim | ....... | H04W 76/14 |
| 11,997,642 B2* | 5/2024 | Pan | ....... | H04W 68/02 |
| 2019/0159018 A1* | 5/2019 | Basu Mallick | ....... | H04W 8/005 |
| 2022/0095168 A1* | 3/2022 | Kuo | ....... | H04W 88/04 |
| 2022/0095398 A1* | 3/2022 | Pan | ....... | H04W 76/14 |
| 2022/0132605 A1* | 4/2022 | Pan | ....... | H04W 40/22 |
| 2022/0141898 A1* | 5/2022 | Kim | ....... | H04W 40/22 |
| | | | | 370/315 |

(Continued)

FOREIGN PATENT DOCUMENTS

| | | |
|---|---|---|
| WO | 2021138511 | 7/2021 |
| WO | 2021178137 | 9/2021 |

OTHER PUBLICATIONS

S.-Y. Lien, C.-C. Chien, G. S.-T. Liu, H.-L. Tsai, R. Li and Y. J. Wang, "Enhanced LTE Device-to-Device Proximity Services," in IEEE Communications Magazine, vol. 54, No. 12, pp. 174-182, Dec. 2016, doi: 10.1109/MCOM.2016.1500670CM (Year: 2016).*

*Primary Examiner* — William D Cumming
(74) *Attorney, Agent, or Firm* — Blue Capital Law Firm, P.C.

(57) ABSTRACT

In supporting multiple connectivity services, a remote UE establishes a PC5 unicast link with a Layer-2 UE-to-Network relay UE. Furthermore, the remote UE establishes at least two connectivity services with at least two data networks over the PC5 unicast link.

20 Claims, 17 Drawing Sheets

(56) References Cited

U.S. PATENT DOCUMENTS

| | | | |
|---|---|---|---|
| 2022/0159753 A1* | 5/2022 | Kuo | H04W 76/14 |
| 2022/0174762 A1* | 6/2022 | Pan | H04W 12/06 |
| 2022/0182972 A1* | 6/2022 | Pan | H04W 68/02 |
| 2023/0047009 A1* | 2/2023 | Kim | H04W 8/005 |
| 2023/0076012 A1* | 3/2023 | Kuo | H04W 76/15 |
| 2023/0148166 A1* | 5/2023 | Kuo | H04W 40/22 |
| | | | 370/328 |
| 2023/0171825 A1* | 6/2023 | Kuo | H04W 76/19 |
| | | | 370/315 |
| 2024/0049050 A1* | 2/2024 | Kuo | H04W 76/15 |
| 2024/0267887 A1* | 8/2024 | Pan | H04W 68/02 |

* cited by examiner

METHOD AND APPARATUS FOR SUPPORTING MULTIPLE CONNECTIVITY SERVICES IN A WIRELESS COMMUNICATION SYSTEM

CROSS-REFERENCE TO RELATED APPLICATIONS

The present Application claims the benefit of U.S. Provisional Patent Application Ser. No. 63/242,388 filed on Sep. 9, 2021 and U.S. Provisional Patent Application Ser. No. 63/252,814 filed on Oct. 6, 2021, the entire disclosures of which are incorporated herein in its entirety by reference.

FIELD

This disclosure generally relates to wireless communication networks, and more particularly, to a method and apparatus for supporting multiple connectivity services in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for supporting multiple connectivity services from the perspective of a remote User Equipment (UE). In one embodiment, the method includes a remote UE establishing a PC5 unicast link with a Layer-2 UE-to-Network relay UE. The method further includes the remote UE establishing at least two connectivity services with at least two data networks over the PC5 unicast link.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V1.1.0, "Proximity based Services (ProSe) in the 5G System (5GS) (Release 17)"; TR 38.836 V17.0.0, "Study on NR sidelink relay (Release 17)"; TS 23.228 V17.1.0, "IP Multimedia Subsystem (IMS); Stage 2 (Release 17)"; and R2-2108924, "Introduction of Rel-17 Sidelink Relay", MediaTek. The standards and documents listed above are hereby expressly incorporated by reference in their entirety.

Figure 1:
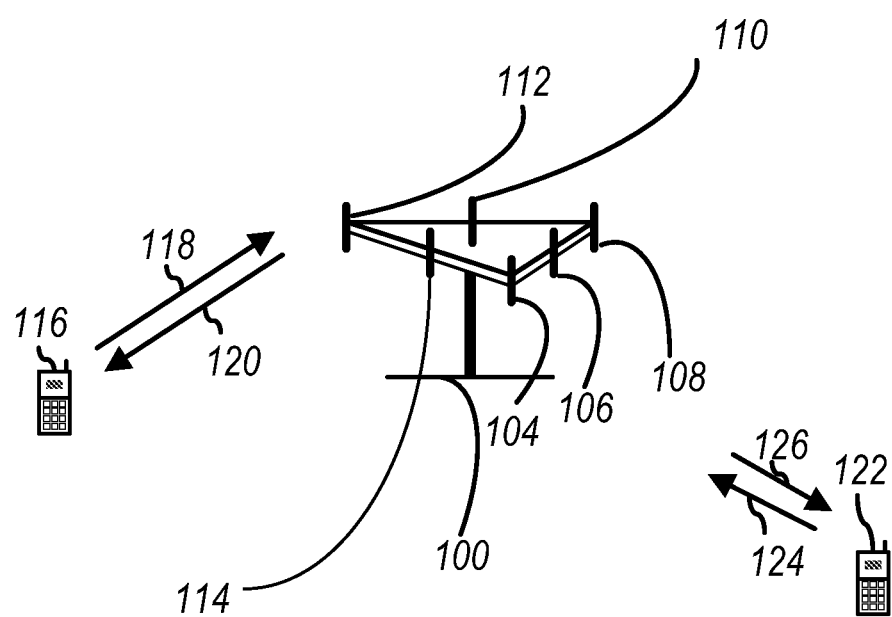
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
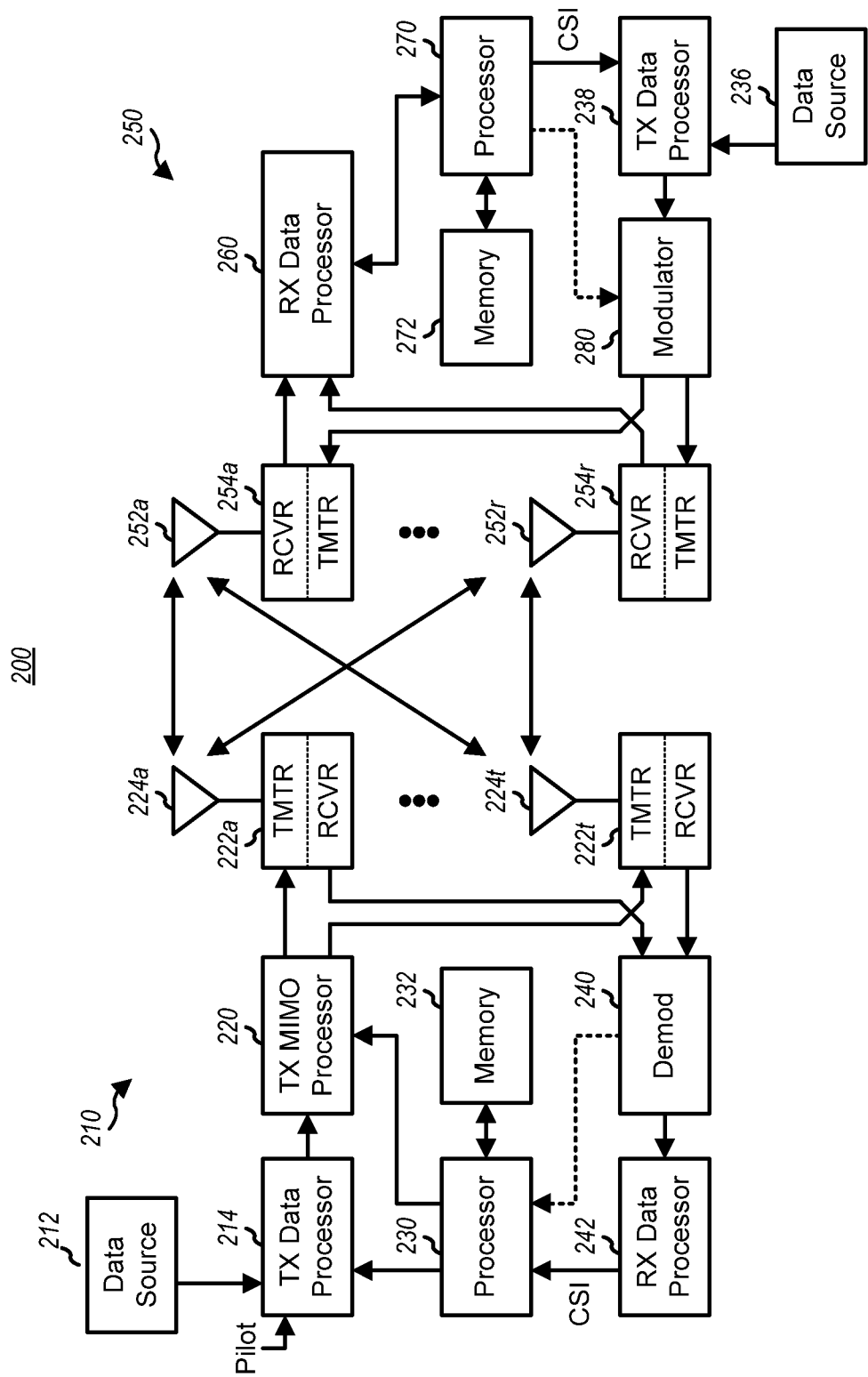
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
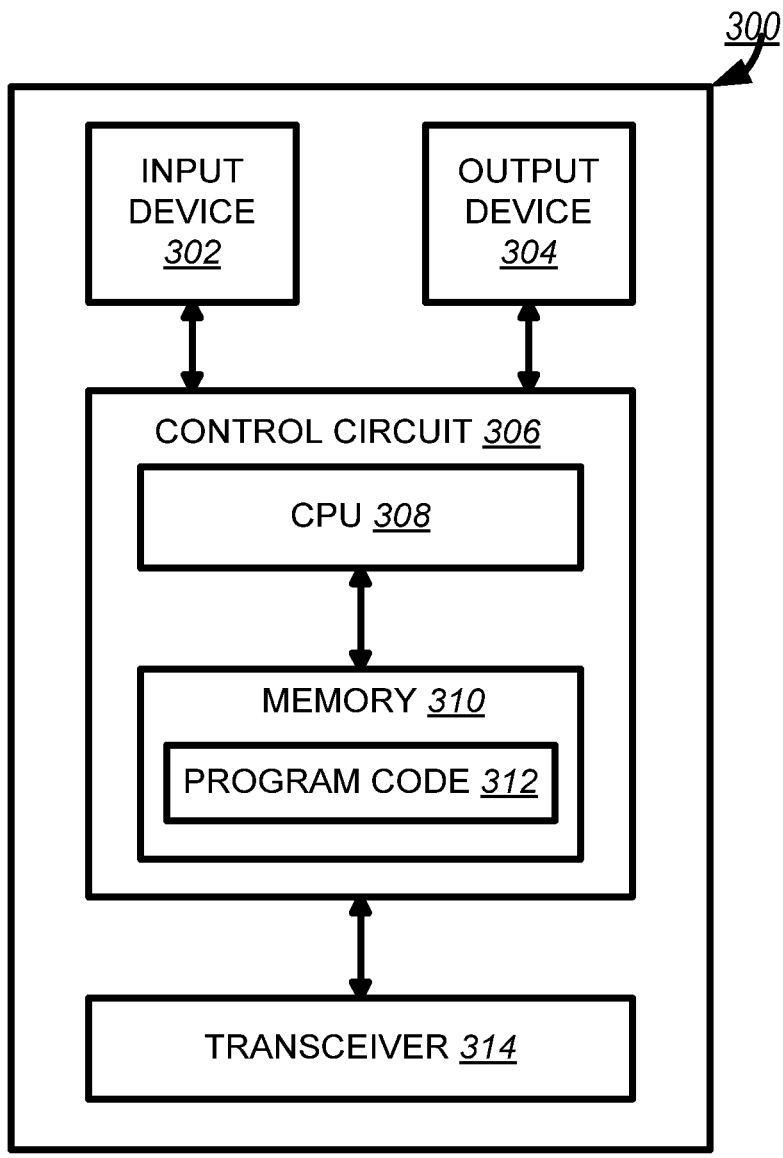
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
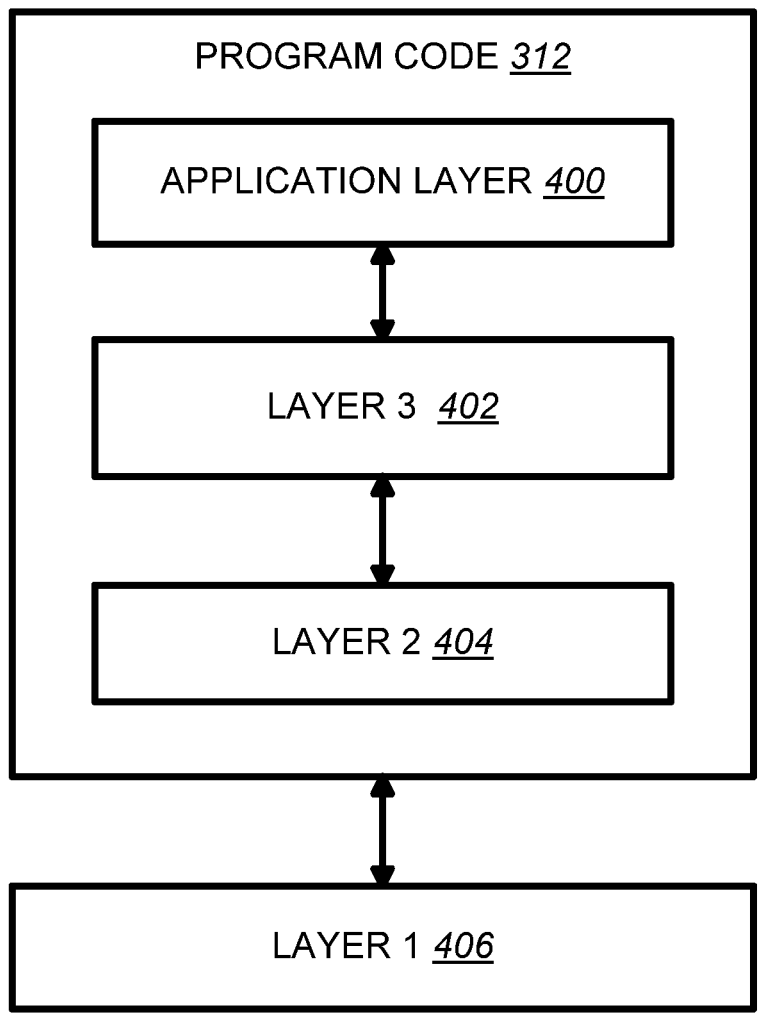
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 specifies procedures for 5G Proximity-based Services (ProSe) UE-to-Network Relay as follows:

3 Definitions of Terms, Symbols and Abbreviations 3.1 Terms

User Info ID: The User Info ID is configured for Model A or Model B Group Member Discovery and 5G ProSe UE-to-Network Relay Discovery either for public safety or commercial applications based on the policy of the HPLMN or via the ProSe application server that allocates it. The User Info ID is sent by the announcing or discoverer or discoveree UE over the air. The definition of values of User Info ID is out of scope of this specification.

4.2.7 5G ProSe UE-to-Network Relay Reference Architecture 4.2.7.1 5G ProSe Layer-3 UE-to-Network Relay Reference Architecture The following FIG. 4.2.7.1-1 show the high level reference architecture for 5G ProSe Layer-3 UE-to-Network Relay. In this figure, the 5G ProSe Layer-3 UE-to-Network Relay may be in the HPLMN or a VPLMN.

Figure 5:
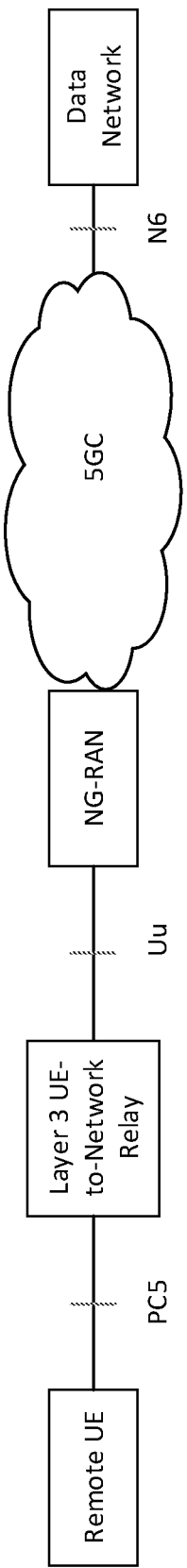
FIG. 5 is a reproduction of FIG. 4.2.7.1-1 of 3GPP TS 23.304 V1.1.0.

FIG. 4.2.7.1-1 of 3GPP TS 23.304 V1.1.0, Entitled "Reference Architecture for 5G ProSe Layer-3 UE-to-Network Relay", is reproduced as FIG. 5

4.2.7.2 5G ProSe Layer-2 UE-to-Network Relay Reference Architecture

FIG. 4.2.7.2-1 show the 5G ProSe Layer-2 UE-to-Network Relay reference architecture. The 5G ProSe Layer-2 Remote UE and 5G ProSe Layer-2 UE-to-Network Relay may be served by the same or different PLMNs. If the serving PLMNs of the 5G ProSe Layer-2 Remote UE and the 5G ProSe Layer-2UE-to-Network Relay are different then NG-RAN is shared by the serving PLMNs, see the 5G MOCN architecture in clause 5.18 of TS 23.501 [4].

Figure 6:
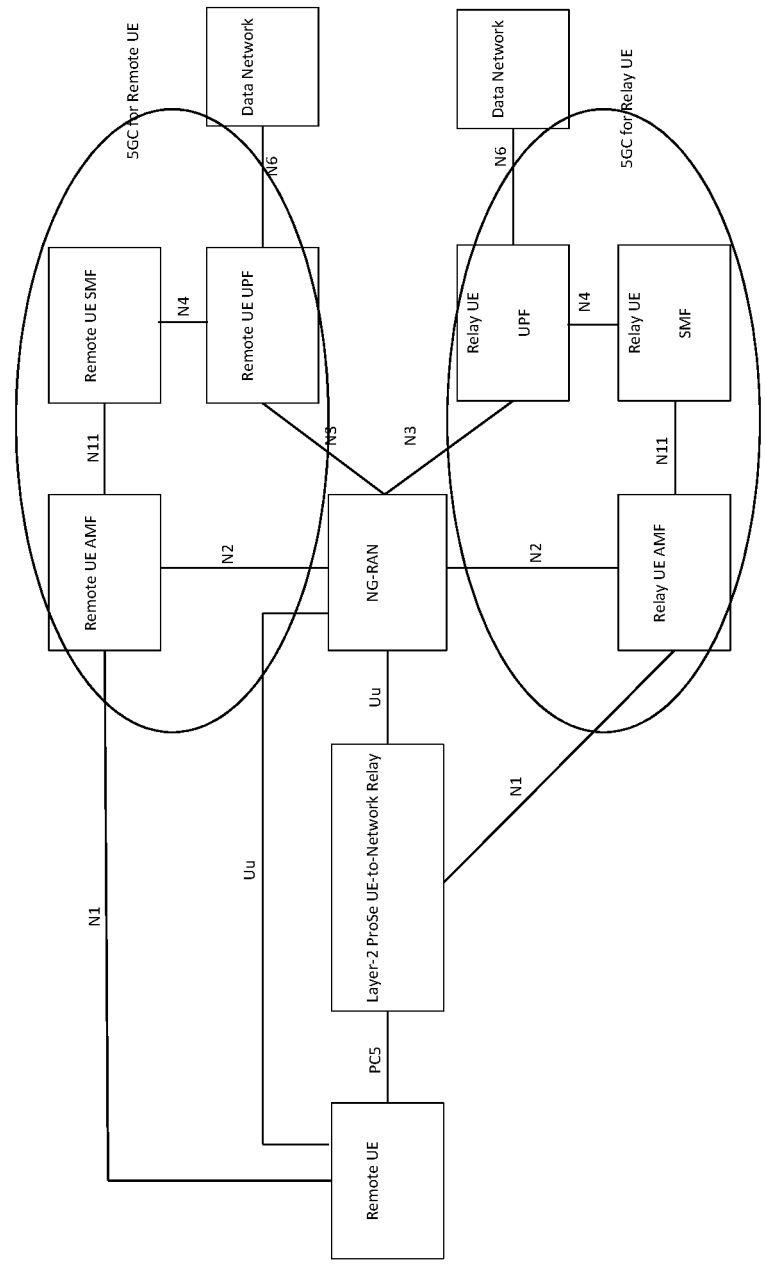
FIG. 6 is a reproduction of FIG. 4.2.7.2-1 of 3GPP TS 23.304 V1.1.0.

FIG. 4.2.7.2-1 of 3GPP TS 23.304 V1.1.0, Entitled "5G ProSe Layer-2 UE-to-Network Relay Reference Architecture", is Reproduced as FIG. 6

4.3.9 5G ProSe UE-to-Network Relay
4.3.9.1 General

Both 5G ProSe Layer-2 and Layer-3 UE-to-Network Relay entity provides the relaying functionality to support connectivity to the network for 5G ProSe Remote UEs. It can be used for both public safety services and commercial services (e.g. interactive service).

Both 5G ProSe Layer-2 and Layer-3 UE-to-Network Relay supports the following functions to enable connectivity to the network:
 5G ProSe UE-to-Network Relay Discovery service as defined in clause 6.3.2.3, to allow discovery by the 5G ProSe Remote UE;
 access the 5GS as a UE as defined in TS 23.501 [4] with the enhancements as specified in clauses 6.2 and 6.6;
 relays unicast traffic (uplink and downlink) between the 5G ProSe Remote UE and the network, supporting IP, Ethernet or Unstructured traffic type.

NOTE: Relaying MBS traffic to a 5G ProSe Remote UE by a 5G ProSe UE-to-Network Relay is not supported in this release of the specification.

4.3.9.2 5G ProSe Layer-3 UE-to-Network Relay

In addition to the common 5G ProSe UE-to-Network Relay functions defined in clause 4.3.9.1, 5G ProSe Layer-3 UE-to-Network Relay supports the following functions to enable connectivity to the network:
 5G ProSe Direct Communication via 5G ProSe Layer-3 UE-to-Network Relay as specified in clause 6.5.1, for the communication with the 5G ProSe Layer-3 Remote UEs for the relay operations;
 end-to-end QoS treatment for the 5G ProSe Layer-3 Remote UE's traffic without N3IWF as defined in clause 5.6.2.1 and when accessing via an N3IWF clause 5.6.2.2;
 IP address management for the 5G ProSe Layer-3 Remote UE as defined in clause 5.5.1.3 in case the 5G ProSe Layer-3 Remote UE uses IP traffic type.

4.3.9.3 5G ProSe Layer-2 UE-to-Network Relay

In addition to the common 5G ProSe UE-to-Network Relay functions defined in clause 4.3.9.1, 5G ProSe Layer-2 UE-to-Network Relay supports the following functions to enable connectivity to the network:
 5G ProSe Direct Communication via 5G ProSe Layer-2 UE-to-Network Relay as specified in clause 6.5.2, for the communication with the 5G ProSe Layer-2 Remote UEs for the relay operations, including end-to-end QoS treatment.
 QoS handling for 5G ProSe Layer-2 UE-to-Network Relay as defined in clause 5.6.2.3.

5.1.4.1 Policy/Parameter Provisioning for 5G ProSe UE-to-Network Relay

The following information is provisioned in the UE in support of the UE assuming the role of a 5G ProSe UE-to-Network Relay:
 1) Authorisation policy for acting as a 5G ProSe Layer-3 and/or Layer-2 UE-to-Network Relay when "served by NG-RAN":
    PLMNs in which the UE is authorized to relay traffic for 5G ProSe Layer-3 and/or Layer-2 Remote UEs.
 2) ProSe Relay Discovery policy/parameters for 5G ProSe UE-to-Network Relay:
    Includes the parameters that enable the UE to perform 5G ProSe UE-to-Network Relay Discovery when provided by PCF or provisioned in the ME or configured in the UICC:
      5G ProSe UE-to-Network Relay Discovery parameters (User Info ID, Relay Service Code(s), UE-to-Network Relay Layer Indicator(s)); the UE-to-Network Relay Layer Indicator indicates whether a particular RSC is offering 5G ProSe Layer-2 or Layer-3 UE-to-Network Relay service.
      Default Destination Layer-2 ID(s) for sending and receiving initial signaling of discovery messages;
      For 5G ProSe Layer 3 UE-to-Network Relay, the PDU Session parameters (PDU Session type, DNN, SSC Mode, S-NSSAI, Access Type Preference) to be used for the relayed traffic for each ProSe Relay Service Code;
      Includes security related content for 5G ProSe Relay UE-to-Network Discovery for each ProSe Relay Service Code.

Editor's note: Whether the security parameters can be provided by the PCF and details of security parameters will be determined by SA3 WG.

NOTE 1: 5G ProSe Relay Discovery policy/parameters can be provided from ProSe Application Server to the 5G ProSe UE-to-Network Relay.

3) For 5G ProSe Layer 3 UE-to-Network Relay, QoS mapping(s):

Each QoS mapping entry includes:
- a mapping between a 5QI value and a PQI value;
- a PQI PDB adjustment factor, for the PC5 communication for the 5G ProSe Layer-3 UE-to-Network Relay operation;
- optional the Relay Service Code(s) associates with the QoS mapping entry.

4) For 5G ProSe Layer 3 UE-to-Network Relay to relay Ethernet or Unstructured traffic from 5G ProSe Layer-3 Remote UE by using IP type PDU Session, Mapping of ProSe Service(s) to ProSe Application Server address information (consisting of IP address/FQDN and transport layer port number).

The following information is provisioned in the UE in support of the UE assuming the role of a 5G ProSe Remote UE and thereby enabling the use of a 5G ProSe UE-to-Network Relay:

1) Authorisation policy for using a 5G ProSe Layer-3 and/or Layer-2 UE-to-Network Relay:
   Indicates whether the UE is authorised to use a 5G ProSe Layer-3 and/or Layer-2 UE-to-Network Relay.

2) Policy/parameters for 5G ProSe UE-to-Network Relay Discovery:
   Includes the parameters for 5G ProSe Relay Discovery and for enabling the UE to connect to the 5G ProSe UE-to-Network Relay after discovery when provided by PCF or provisioned in the ME or configured in the UICC:
   - 5G ProSe UE-to-Network Relay Discovery parameters (User Info ID, Relay Service Code(s), UE-to-Network Relay Layer indicator(s)); the UE-to-Network Relay Layer Indicator indicates whether a particular RSC is offering 5G ProSe Layer-2 or Layer-3 UE-to-Network Relay service.
   - Default Destination Layer-2 ID(s) for sending and receiving initial signaling of discovery messages;
   - For 5G ProSe Layer-3 UE-to-Network Relay, the PDU Session parameters (PDU Session type, DNN, SSC Mode, S-NSSAI, Access Type Preference) to be used for the relayed traffic without using N3IWF access, or an indication of N3IWF access, for each ProSe Relay Service Code;
   - Includes security related content for 5G ProSe UE-to-Network Relay Discovery for each ProSe Relay Service Codes.

3) Policy/parameters for N3IWF selection for 5G ProSe Layer-3 Remote UE:
   - N3IWF identifier configuration for 5G ProSe Layer-3 Remote UE (either FQDN or IP address) in the HPLMN.
   - 5G ProSe Layer-3 UE-to-Network Relay access node selection information—a prioritized list of PLMNs for N3IWF selection. It also indicates if selection of an N3IWF in a PLMN should be based on Tracking Area Identity FQDN or on Operator Identifier FQDN.

Editor's note: Whether the security parameters can be provided by the PCF and details of security parameters will be determined by SA3 WG.

NOTE 2: ProSe Relay Discovery policy/parameters can be provided from ProSe Application Server to the 5G ProSe Remote UE.

The following information is provisioned in the UE in support of the UE assuming the role of a 5G ProSe UE-to-Network Relay as well as in the UE in support of the UE assuming the role of a 5G ProSe Remote UE and thereby enabling the use of a 5G ProSe UE-to-Network Relay:

1) Radio parameters for 5G ProSe UE-to-Network Relay Discovery when the UE is not "served by NG-RAN":
   Includes the radio parameters NR PC5 with Geographical Area(s) and an indication of whether they are "operator managed" or "non-operator managed". The UE uses the radio parameters to perform 5G ProSe Direct Discovery over PC5 reference point when "not served by NG-RAN" only if the UE can reliably locate itself in the corresponding Geographical Area. Otherwise, the UE is not authorized to transmit.

2) Radio parameters for 5G ProSe Relay UE-to-Network Communication when the UE is not "served by NG-RAN":
   Includes the radio parameters NR PC5 with Geographical Area(s) and an indication of whether they are "operator managed" or "non-operator managed". The UE uses the radio parameters to perform 5G ProSe Direct Communication over PC5 reference point when "not served by NG-RAN" only if the UE can reliably locate itself in the corresponding Geographical Area. Otherwise, the UE is not authorized to transmit.

5.8.1.8 User Info ID

User Info ID (including Announcer Info, Discoverer Info, Discoveree Info) is defined in clause 3.1.

5.8.3 Identifiers for 5G ProSe UE-to-Network Relay 5.8.3.1 Common Identifiers for 5G ProSe UE-to-Network Relay The following parameters are used for the 5G ProSe UE-to-Network Relay Discovery Announcement message (Model A), where Source Layer-2 ID and Destination Layer-2 ID are used for sending and receiving the message, and Announcer Info and Relay Service Code are contained in the message:

Source Layer-2 ID: the 5G ProSe UE-to-Network Relay self-selects a Source Layer-2 ID for 5G ProSe UE-to-Network Relay Discovery.

Destination Layer-2 ID: the Destination Layer-2 ID for 5G ProSe UE-to-Network Relay Discovery is selected based on the configuration as described in clause 5.1.4.1.

Announcer Info: provides information about the announcing user.

Relay Service Code: parameter identifying a connectivity service the 5G ProSe UE-to-Network Relay provides to a 5G ProSe Remote UE. The Relay Service Codes are configured in a 5G ProSe UE-to-Network Relay for advertisement. Additionally, the Relay Service Code may also identifies authorized users the 5G ProSe UE-to-Network Relay would offer service to, and may be used to select the related security policies or information e.g. necessary for authentication and authorization between the 5G ProSe Remote UE and the 5G ProSe UE-to-Network Relay (e.g. a Relay Service Code for relays for police members only would be different than a Relay Service Code for relays for Fire Fighters only, even though potentially they provided connectivity to same DN e.g. to support Internet Access).

The following parameters are used for the 5G ProSe UE-to-Network Relay Discovery Solicitation message (Model B), where Source Layer-2 ID and Destination Layer-2 ID are used for sending and receiving the message, and Discoverer Info and Relay Service Code are contained in the message:

Source Layer-2 ID: the 5G ProSe Remote-UE self-selects a Source Layer-2 ID for 5G ProSe UE-to-Network Relay Discovery.

Destination Layer-2 ID: the Destination Layer-2 ID for 5G ProSe UE-to-Network Relay Discovery is selected based on the configuration as described in clause 5.1.4.1.

Discoverer Info: provides information about the discoverer user.

Relay Service Code: information about connectivity that the discoverer UE is interested in. The Relay Service Codes are configured in the 5G ProSe Remote UEs interested in related connectivity services.

The following parameters are used in the 5G ProSe UE-to-Network Relay Discovery Response message (Model B), where Source Layer-2 ID and Destination Layer-2 ID are used for sending and receiving the message, and Discoveree Info and Relay Service Code are contained in the message:

Source Layer-2 ID: the 5G ProSe UE-to-Network Relay self-selects a Source Layer-2 ID for 5G ProSe UE-to-Network Relay Discovery.

Destination Layer-2 ID: set to the Source Layer-2 ID of the received 5G ProSe UE-to-Network Relay Discovery Solicitation message.

Relay Service Code: identifies the connectivity service the 5G ProSe UE-to-Network Relay provides to 5G ProSe Remote UEs that matches the Relay Service Code from the corresponding Discovery Solicitation message.

Discoveree Info: provides information about the discoveree.

5.8.3.2 Identifiers for 5G ProSe Layer-3 UE-to-Network Relay

The following parameters may be used in addition to the parameters specified in 5.8.3.1, in 5G ProSe Layer-3 UE-to-Network Relay supporting N3IWF discovery procedure (for both Model A and Model B) to assist with N3IWF selection:

Relay TAI: indicates the Tracking Area Identity corresponding to the serving cell of the 5G ProSe Layer-3 UE-to-Network Relay.

For 5G ProSe Layer-3 UE-to-Network relay, a Relay Service Code in the Announcement Message is associated with a set of PDU session parameters (e.g. PDU Session type, DNN, SSC Mode, S-NSSAI, Access Type Preference). The Relay Service Code may also represent if the relay UE can provide secure N3IWF connection.

For 5G ProSe Layer-3 Remote UE discovering 5G ProSe Layer-3 UE-to-Network relay, the Relay Service Code in the Solicitation Message represents the PDU session parameters that a PDU session of the relay should be able to support. The Relay Service Code may also represent if the remote UE requires secure N3IWF connection.

5.8.3.3 Identifiers for 5G ProSe Layer-2 UE-to-Network Relay

Editor's note: It is FFS what identifiers are used in addition to the identifiers specified in clause 5.8.3.1 for Layer-2 UE-to-Network Relay use case.

Editor's note: It is FFS with what information the RSC is associated for Layer-2 UE-to-Network Relay use case.

6.3.2.3 UE-to-Network Relay Discovery
6.3.2.3.1 General

5G ProSe UE-to-Network Relay Discovery is applicable to both 5G ProSe Layer-3 and Layer-2 UE-to-Network relay discovery for public safety use and commercial services. To perform 5G ProSe UE-to-Network Relay Discovery, the 5G ProSe Remote UE and the 5G ProSe UE-to-Network Relay are pre-configured or provisioned with the related information as described in clause 5.1. In 5G ProSe UE-to-Network Relay Discovery, the UEs use pre-configured or provisioned information for the relay discovery procedures as defined in clause 5.1.4.1.

The Relay Service Code (RSC) is used in the 5G ProSe UE-to-Network Relay discovery, to indicate the connectivity service the 5G ProSe UE-to-Network Relay provides to the 5G ProSe Remote UE. The RSCs are configured on the 5G ProSe UE-to-Network Relay and the 5G ProSe Remote UE as defined in clause 5.1.4. The 5G ProSe UE-to-Network Relay and the 5G ProSe Remote UE are aware of whether a RSC is offering 5G ProSe Layer-2 or Layer-3 UE-to-Network Relay service based the policy as specified in clause 5.1.4. A 5G ProSe UE-to-Network Relay supporting multiple RSCs can advertise the RSCs using multiple discovery messages, with one RSC per discovery message.

Additional information used for the 5G ProSe UE-to-Network Relay (re)selection and connection maintenance can be advertised using a separate discovery messages of type "Relay Discovery Additional Information". This may include for example the related system information of the 5G ProSe UE-to-Network Relay's serving cell, as defined in TS 38.300 [12].

Both Model A and Model B discovery are supported:

Model A uses a single discovery protocol message (Announcement).

Model B uses two discovery protocol messages (Solicitation and Response).

For Relay Discovery Additional Information, only Model A discovery is used.

6.3.2.3.2 Procedure for UE-to-Network Relay Discovery with Model A

Depicted in FIG. 6.3.2.3.2-1 is the procedure for UE-to-Network Discovery with Model A.

Figure 7:
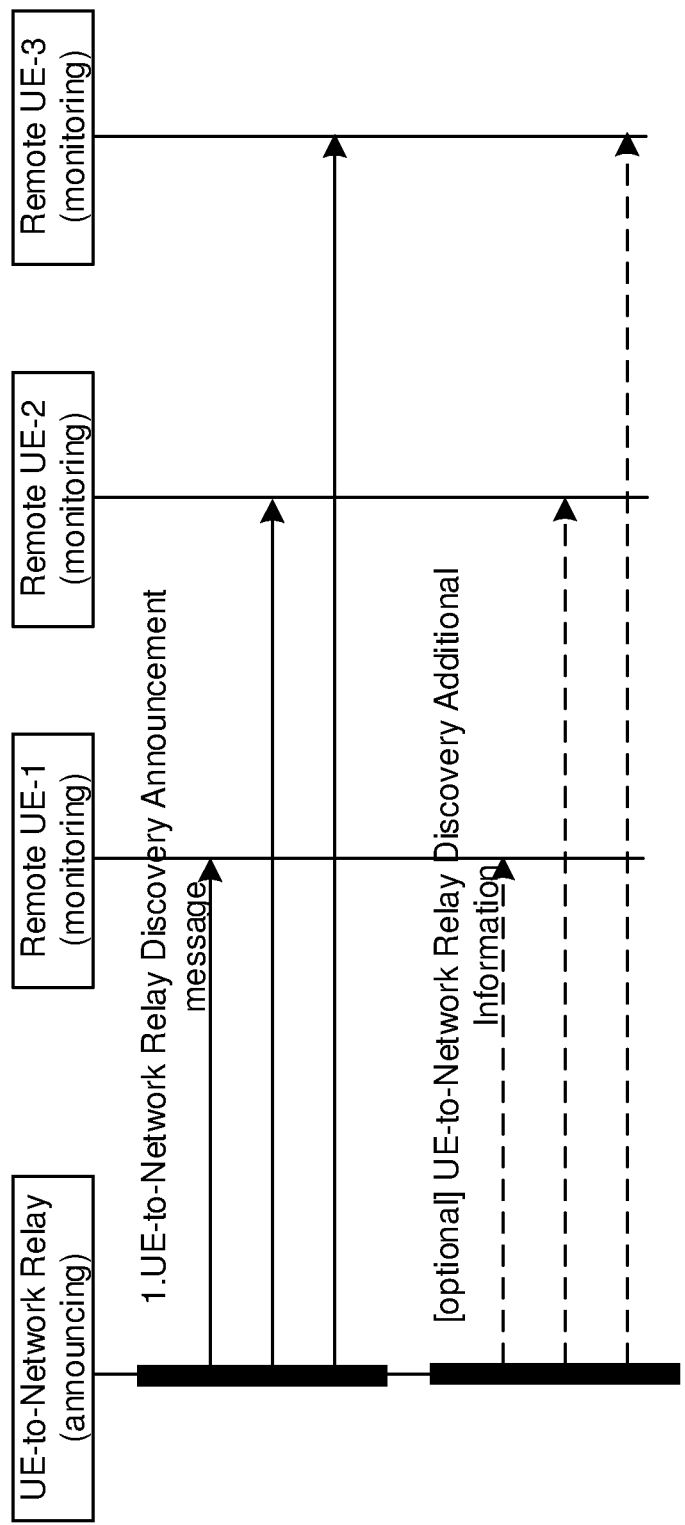
FIG. 7 is a reproduction of FIG. 6.3.2.3.2-1 of 3GPP TS 23.304 V1.1.0.

FIG. 6.3.2.3.2-1 of 3GPP TS 23.304 V1.1.0, Entitled "UE-to-Network Relay Discovery with Model A", is Reproduced as FIG. 7

1. The UE-to-Network Relay sends a UE-to-Network Relay Discovery Announcement message. The UE-to-Network Relay Discovery Announcement message contains Announcer Info and RSC, and is sent using the Source Layer-2 ID and Destination Layer-2 ID as described in clause 5.8.3.

For Layer-3 UE-to-Network Relay, the UE-to-Network Relay shall only include a RSC in the UE-to-Network Relay Discovery Announcement when the S-NSSAI associated with that RSC belongs to the Allowed NSSAI of the UE-to-Network Relay.

The Remote UE (1 to 3) determines the Destination Layer-2 ID for signalling reception. The Destination Layer-2 ID is configured with the UE(s) as specified in clause 5.1.4.1.

Remote UE (1 to 3) monitors announcement messages with the UE-to-Network RSC corresponding to the desired services.

Optionally, the ProSe UE-to-Network Relay may also send UE-to-Network Relay Discovery Additional Information messages. The parameters contained in this message are described in clause 5.8.3.

6.3.2.3.3 Procedure for UE-to-Network Relay Discovery with Model B

Depicted in FIG. 6.3.2.3.3-1 is the procedure for UE-to-Network Relay Discovery with Model B.

Figure 8:
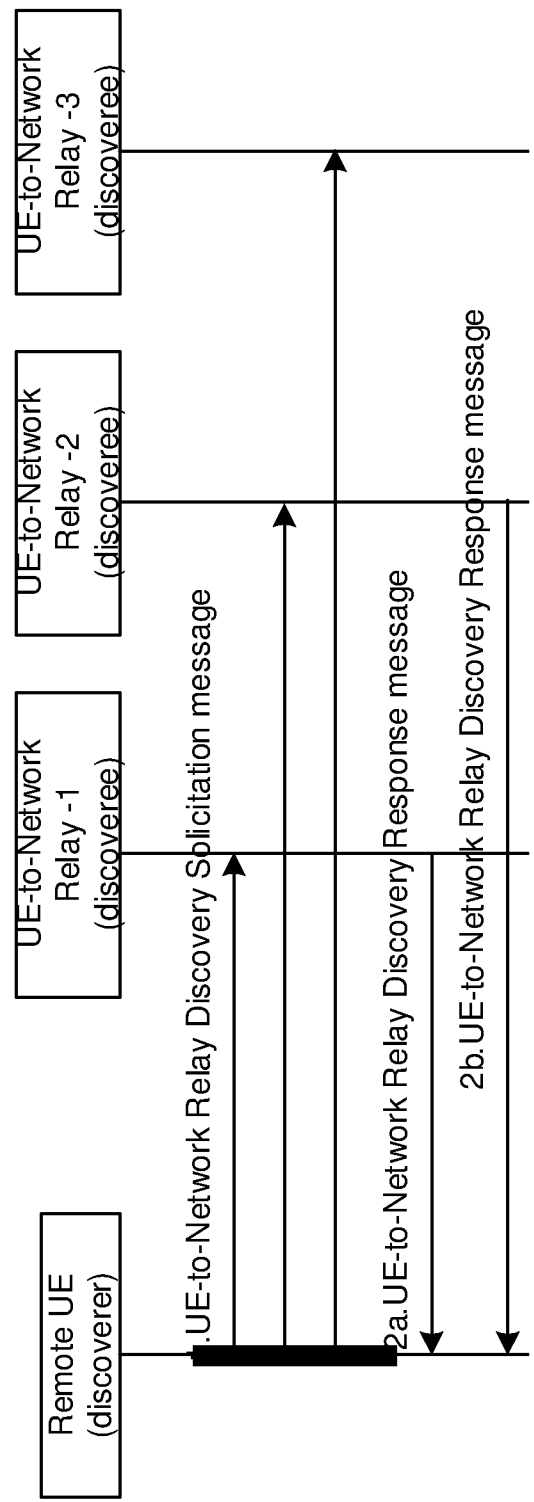
FIG. 8 is a reproduction of FIG. 6.3.2.3.3-1 of 3GPP TS 23.304 V1.1.0.

FIG. 6.3.2.3.3-1 of 3GPP TS 23.304 V1.1.0, Entitled "UE-to-Network Relay Discovery with Model B", is Reproduced as FIG. 8

1. The 5G ProSe UE-to-Network Relay sends a UE-to-Network Relay Discovery Announcement message. The UE-to-Network Relay Discovery Announcement message contains the Type of Discovery Message, Announcer Info and RSC, and is sent using the Source Layer-2 ID and Destination Layer-2 ID as described in clause 5.8.3.

For 5G ProSe Layer-3 UE-to-Network Relay, the 5G ProSe Layer-3 UE-to-Network Relay shall only include a RSC in the UE-to-Network Relay Discovery Announcement when the S-NSSAI associated with that RSC belongs to the Allowed NSSAI of the UE-to-Network Relay.

The 5G ProSe Remote UE (1 to 3) determines the Destination Layer-2 ID for signalling reception. The Destination Layer-2 ID is configured with the UE(s) as specified in clause 5.1.4.1.

5G ProSe Remote UE (1 to 3) monitors announcement messages with the 5G ProSe UE-to-Network RSC corresponding to the desired services.

Optionally, the 5G ProSe UE-to-Network Relay may also send UE-to-Network Relay Discovery Additional Information messages. The parameters contained in this message are described in clause 5.8.3.

The 5G ProSe Remote UE selects the 5G ProSe UE-to-Network Relay based on the information received in step 1.

NOTE: Access Stratum layer information used for 5G ProSe UE-to-Network Relay selection is specified in RAN specifications.

6.3.2.3.3 Procedure for 5G ProSe UE-to-Network Relay Discovery with Model B

Depicted in FIG. 6.3.2.3.3-1 is the procedure for 5G ProSe UE-to-Network Relay Discovery with Model B.

Figure 9:
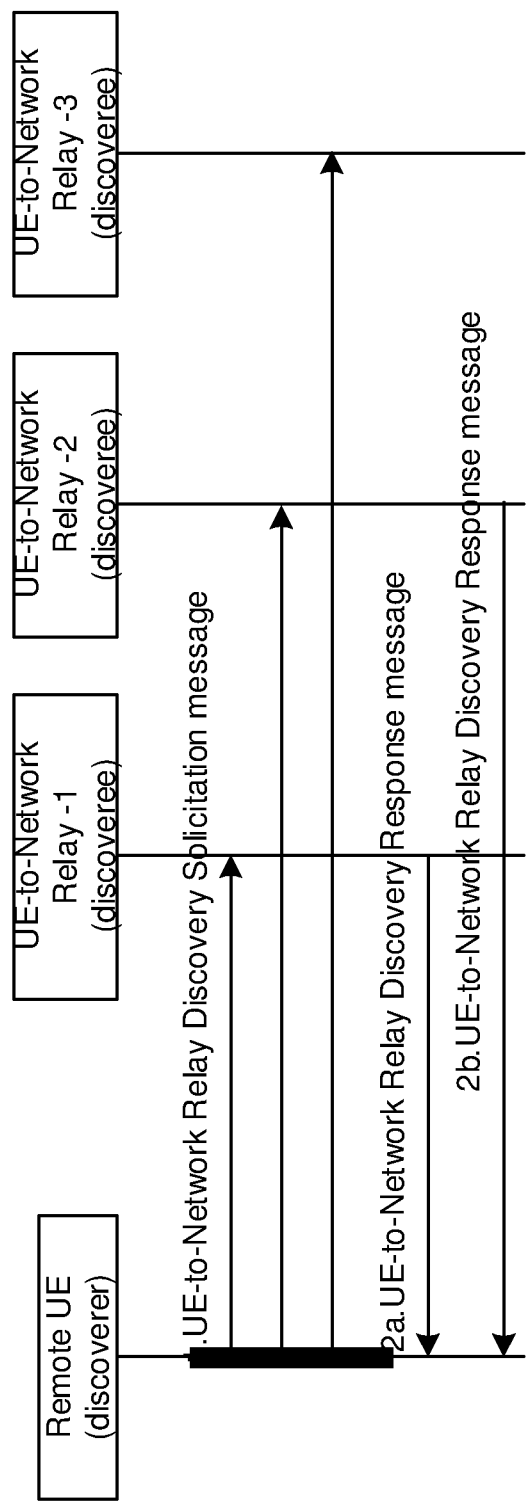
FIG. 9 is a reproduction of FIG. 6.3.2.3.3-1 of 3GPP TS 23.304 V1.1.0.

FIG. 6.3.2.3.3-1 of 3GPP TS 23.304 V1.1.0, Entitled "5G ProSe UE-to-Network Relay Discovery with Model B", is Reproduced as FIG. 9

1. The 5G ProSe Remote UE sends a 5G ProSe UE-to-Network Relay Discovery Solicitation message. The 5G ProSe UE-to-Network Discovery Solicitation message contains the Type of Discovery Message, Discoverer Info and RSC, and is send using the Source Layer-2 ID and Destination Layer-2 ID as described in clause 5.8.3. The 5G ProSe Remote UE discovering a 5G ProSe UE-to-Network Relay sends a solicitation message with the RSC which is associated to the desired connectivity service. The RSC is based on the Policy/Parameters specified in clause 5.1.4.1.

How the 5G ProSe UE-to-Network Relays (1 to 3) determine the Destination Layer-2 ID for signalling reception is specified in clause 5.8.3. The Destination Layer-2 ID is configured with the UE(s) as specified in clause 5.1.4.1.

2. The 5G ProSe UE-to-Network Relays (1 and 2) that match the values of the RSC contained in the solicitation message respond to the 5G ProSe Remote UE with a UE-to-Network Relay Discovery Response message. The 5G ProSe UE-to-Network Relay Discovery Response message contains the Type of Discovery Message, Discoveree Info and RSC, and is sent using the Source Layer-2 ID and Destination Layer-2 ID as described in clause 5.8.3.

For 5G ProSe Layer-3 UE-to-Network Relay, the 5G ProSe UE-to-Network Relay shall only respond to a matching RSC in the UE-to-Network Relay Discovery Solicitation message when the S-NSSAI associated with that RSC belongs to the Allowed NSSAI of the 5G ProSe UE-to-Network Relay.

The 5G ProSe Remote UE selects the 5G ProSe UE-to-Network Relay based on the information received in step 2.

6.4.3.1 Layer-2 Link Establishment Over PC5 Reference Point

To perform unicast mode of ProSe Direct communication over PC5 reference point, the UE is configured with the related information as described in clause 5.1.3.

FIG. 6.4.3.1-1 shows the layer-2 link establishment procedure for the unicast mode of ProSe Direct communication over PC5 reference point.

Figure 10:
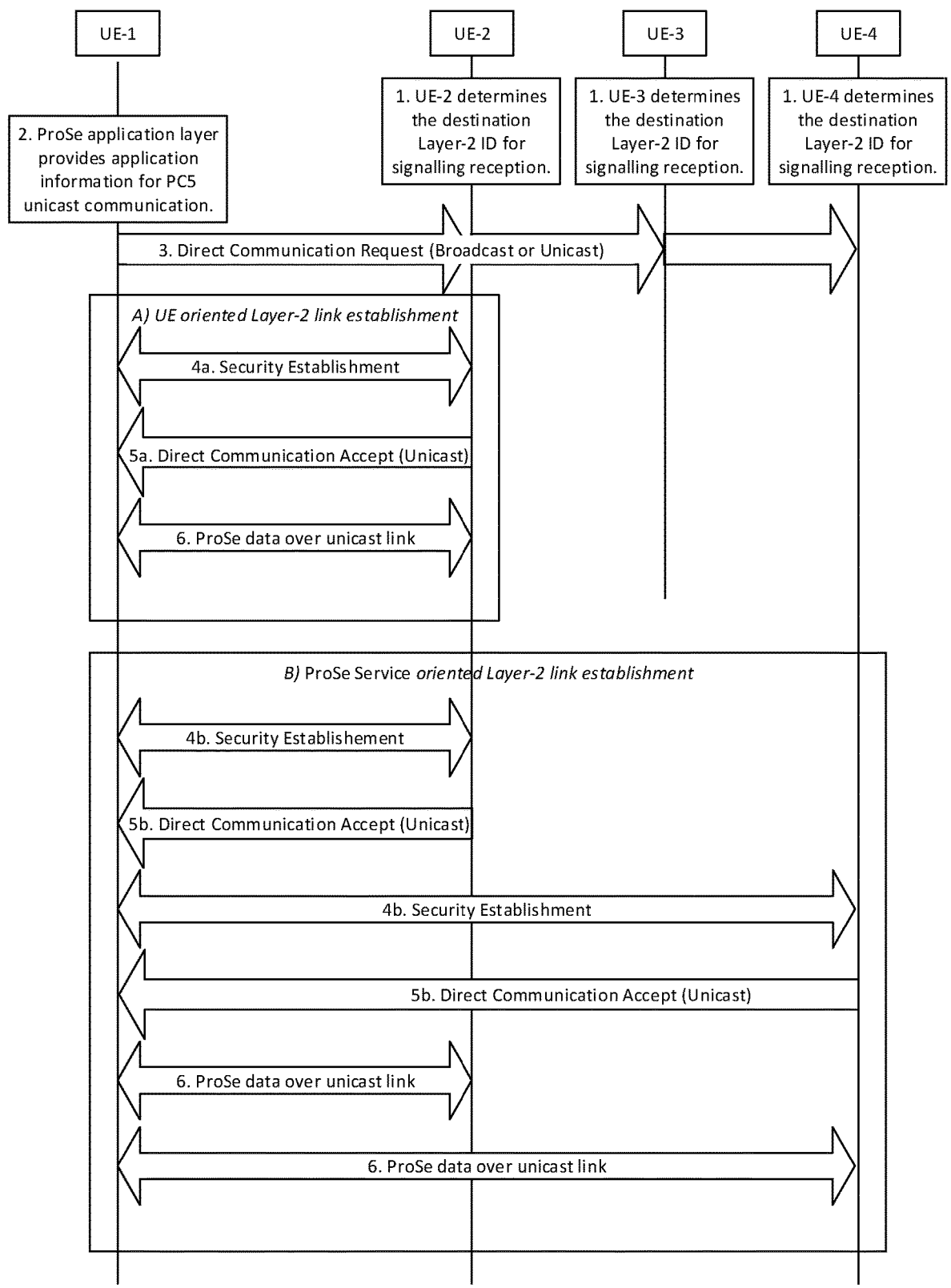
FIG. 10 is a reproduction of FIG. 6.4.3.1-1 of 3GPP TS 23.304 V1.1.0.

FIG. 6.4.3.1-1 of 3GPP TS 23.304 V1.1.0, Entitled "Layer-2 Link Establishment Procedure", is Reproduced as FIG. 10

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPv6 address allocation mechanism is supported by the initiating UE, i.e., acting as an IPv6 Router; or "DHCPv4 server & IPv6 Router" if both IPv4 and IPv6 address allocation mechanism are supported by the initiating UE; or "address allocation not supported" if neither IPv4 nor IPv6 address allocation mechanism is supported by the initiating UE.

Link-Local IPv6 Address: a link-local IPv6 address formed locally based on RFC 4862 [17] if UE-1 does not support the IPv6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and the associated ProSe identifier(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc) and the associated ProSe identifiers(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:

The PC5 Link Identifier and PFI are provided to the AS layer, together with the ProSe data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

6.4.3.6 Layer-2 Link Management Over PC5 Reference Point for 5G ProSe UE-to-Network Relay The Layer-2 link procedures over PC5 reference point for unicast mode 5G ProSe Direct Communication as depicted from clause 6.4.3.1 to clause 6.4.3.5 can be used for the PC5 reference point between 5G ProSe Remote UE and 5G ProSe UE-to-Network Relay, with the following differences and clarifications:

The Layer-2 link modification procedure is applicable to ProSe Communication via 5G ProSe Layer-3 UE-to-Network Relay, other procedures are applicable to both ProSe Communication via 5G ProSe Layer-2 UE-to-Network Relay and ProSe Communication via 5G ProSe Layer-3 UE-to-Network Relay.

Editor's note: Whether the Layer-2 link modification procedure is also applicable to ProSe Communication via 5G ProSe Layer-2 UE-to-Network Relay requires cooperation with RAN2.

The UE oriented Layer-2 link establishment is used with UE-1 representing the 5G ProSe Remote UE and UE-2 representing the 5G ProSe UE-to-Network Relay. For other procedures either UE-1 represents the 5G ProSe Remote UE and UE-2 represents the 5G ProSe UE-to-Network Relay, or UE-1 represents the 5G ProSe UE-to-Network Relay and UE-2 represents the 5G ProSe Remote UE. I.e. the Layer-2 link establishment is initiated by the 5G ProSe Remote UE, while other procedures may be initiated either by the 5G ProSe Remote UE or by the 5G ProSe UE-to-Network Relay.

For the UE oriented Layer-2 link establishment as described in the clause 6.4.3.1, In step 1, the 5G ProSe Remote UE determines the destination Layer-2 ID for PC5 unicast link establishment based on the unicast source Layer-2 ID of the selected 5G ProSe UE-to-Network relay (as specified in clause 5.8.3) during UE-to-Network Relay discovery as specified in clause 6.3.2.3.

In step 2, 5G ProSe Remote UE (UE-1) determines the Relay Service Code to be used. The Relay Service Code to be used is selected from the received Relay Service Code(s) during UE-to-Network Relay discovery as specified in clause 6.3.2.3.

In step 3, 5G ProSe Remote UE (UE-1) sends a unicast Direct Communication Request message to the selected 5G ProSe UE-to-Network Relay. The destination Layer-2 ID used to send the Direct Communication Request message shall be unicast Layer-2 ID as determined in step 1. The Direct Communication Request message includes:

Source User Info: the identity of the Remote UE requesting relay operation.

Target User Info: the identity of the UE-to-Network Relay provided to the 5G ProSe Remote UE during UE-to-Network Relay Discovery procedure.

Relay Service Code: indicates the connectivity service provided by the 5G ProSe UE-to-Network Relay as requested by the 5G ProSe Remote UE.

Security Information: the information for the establishment of security.

In step 4 and step 5, step 4a and step 5a are performed if the 5G ProSe UE-to-Network Relay's identity matches the identity provided in the Target User Info and the Relay Service Code is one of the Relay Service Codes included during UE-to-Network Relay discovery as specified in clause 6.3.2.3.. The Source User Info in the Direct Communication Accept message is the identity of the UE-to-Network Relay. In case of 5G ProSe Layer-2 UE-to-Network Relay, the Remote UE does not send the IP Address Configuration, Link-Local IPv6 Address and QoS Info to the 5G ProSe Layer-2 UE-to-Network Relay, and the Direct Communication Accept message does not include IP Address Configuration, Link-Local IPv6 Address and QoS Info. In case of 5G ProSe Layer-3 UE-to-Network Relay, the Direct Communication Accept message does not include the IP Address Configuration indicating the value "address allocation not supported".

In case of 5G ProSe Layer-2 UE-to-Network Relay, step 6 is not performed.

For the Layer-2 link release as described in the clause 6.4.3.3,

In step 1, if the Layer-2 link release procedure is initiated by the 5G ProSe UE-to-Network Relay, the Disconnect Request message may indicate the 5G ProSe UE-to-Network Relay is temporarily not available as described in clause 5.12.

NOTE: The form of the temporarily not available indication will be determined by stage 3.

If the service authorization for acting as a 5G ProSe Remote UE or as a 5G ProSe UE-to-Network Relay is revoked, the 5G ProSe UE-to-Network Relay should initiate the release of the layer-2 link that the revoked authorization affects.

For the Layer-2 link modification as described in the clause 6.4.3.4,

In step1, the Layer-2 link modification procedure may be initiated by the 5G ProSe Layer-3 Remote UE based on the application information received from its ProSe application layer. The Link Modification Request message may include the PC5 QoS Rule(s) for the PC5 QoS Flow(s) to be added or modified as described in clause 5.6.2.1. The Layer-2 link modification procedure may be initiated by the 5G ProSe Layer-3 UE-to-Network Relay based on the information received from the SMF via NAS signalling from SMF.

A 5G ProSe Remote UE and a 5G ProSe UE-to-Network Relay shall set up a separate PC5 unicast links if an existing unicast link(s) was established with a different Relay Service Code or without a Relay Service Code.

6.5.1 5G ProSe Communication Via 5G ProSe Layer-3 UE-to-Network Relay 6.5.1.1 5G ProSe Communication Via 5G ProSe Layer-3 UE-to-Network Relay without N3IWF A 5G ProSe Layer-3 UE-to-Network Relay registers to the network (if not already registered). 5G ProSe Layer-3 UE-to-Network Relay establishes a PDU Session(s) or modifies an existing PDU Session(s) in order to provide relay traffic towards 5G ProSe Layer-3 Remote UE(s). PDU Session(s) supporting 5G ProSe Layer-3 UE-to-Network Relay shall only be used for 5G ProSe Layer-3 Remote UE(s) relay traffic.

The PLMN serving the 5G ProSe Layer-3 UE-to-Network Relay and the PLMN to which the 5G ProSe Layer-3 Remote UE registers can be the same PLMN or two different PLMNs.

Figure 11:
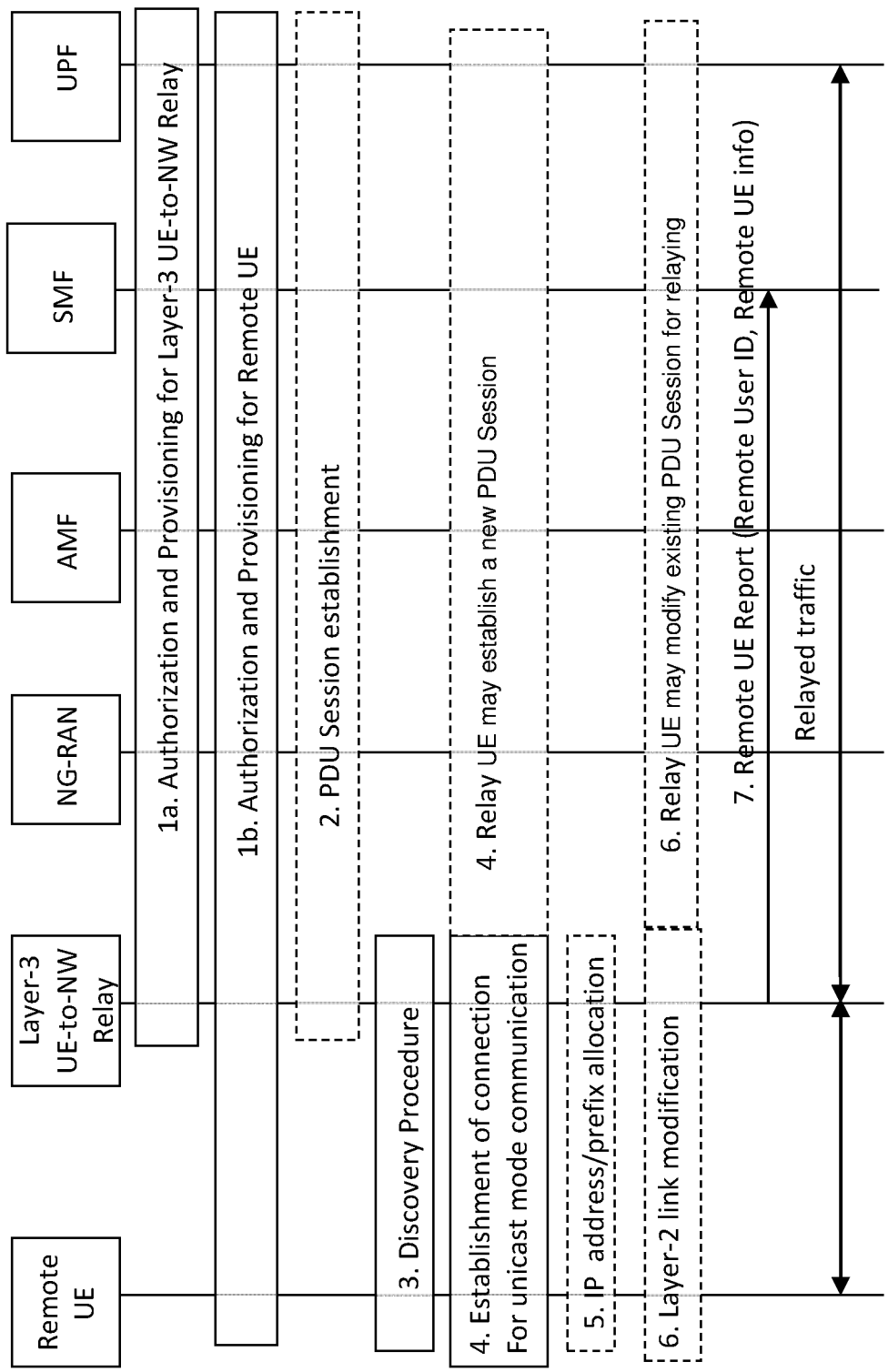
FIG. 11 is a reproduction of FIG. 6.5.1.1-1 of 3GPP TS 23.304 V1.1.0.

FIG. 6.5.1.1-1 of 3GPP TS 23.304 V1.1.0, Entitled "5G ProSe Communication Via 5G ProSe Layer-3 UE-to-Network Relay without N3IWF", is Reproduced as FIG. 11

1. Service authorization and provisioning are performed for the 5G ProSe Layer-3 UE-to-Network Relay (step 1a) and 5G ProSe Layer-3 Remote UE (step 1b) as described in clause 6.2.
2. The 5G ProSe Layer-3 UE-to-Network Relay may establish a PDU Session for relaying. In case of IPv6, the 5G ProSe Layer-3 UE-to-Network Relay obtains the IPv6 prefix via prefix delegation function from the network as defined in TS 23.501 [4].
NOTE 1: 5G ProSe Layer-3 UE-to-Network Relay can establish a PDU Session for any Relay Service Code it supports before the connection is established with the 5G ProSe Layer-3 Remote UE.
3. The 5G ProSe Layer-3 Remote UE performs discovery of a 5G ProSe Layer-3 UE-to-Network Relay as described in clause 6.3.2.3. As part of the discovery procedure the 5G ProSe Layer-3 Remote UE learns about the connectivity service the 5G ProSe Layer-3 UE-to-Network Relay provides.
4. The 5G ProSe Layer-3 Remote UE selects a 5G ProSe Layer-3 UE-to-Network Relay and establishes a connection for unicast mode communication as described in clause 6.4.3.6.

If there is no PDU Session associated with the Relay Service Code or a new PDU Session for relaying is needed, the 5G ProSe Layer-3 UE-to-Network Relay initiates a new PDU Session establishment procedure for relaying before completing the PC5 connection establishment.

The 5G ProSe Layer-3 UE-to-Network Relay determines the PDU Session type for relaying as specified in clause 5.4.1.1.

According to the PDU Session Type for relaying, the 5G ProSe Layer-3 UE-to-Network Relay performs relaying function at the corresponding layer as follows:

When the IP type PDU Session is used for IP traffic over PC5 reference point, the 5G ProSe Layer-3 UE-to-Network Relay acts as an IP router. For IPv4, the 5G ProSe Layer-3 UE-to-Network Relay performs IPv4 NAT between IPv4 addresses assigned to the 5G ProSe Layer-3 Remote UE and the IPv4 address assigned to the PDU Session used for the relay traffic.

When the Ethernet type PDU Session is used for Ethernet traffic over PC5 reference point, the 5G ProSe Layer-3 UE-to-Network Relay acts as an Ethernet switch.

When the Unstructured type PDU Session is used for Unstructured traffic over PC5 reference point, the 5G ProSe Layer-3 UE-to-Network Relay performs traffic relaying based on a mapping between the PC5 Link Identifier and the PDU Session ID, and a mapping between PFI for PC5 Layer-2 link and the QFI for the PDU Session. These mappings are created when the Unstructured type PDU Session is established for the 5G ProSe Layer-3 Remote UE.

When the IP type PDU Session is used for Ethernet or Unstructured traffic over PC5 reference point, the 5G ProSe Layer-3 UE-to-Network Relay uses IP tunneling. For this IP tunnelling, the 5G ProSe Layer-3 UE-to-Network Relay locally assigns an IP address/prefix for the 5G ProSe Layer-3 Remote UE and uses it on the Uu reference point to encapsulate and decapsulate the uplink and downlink traffic for the 5G ProSe Layer-3 Remote UE. The tunnelled traffic over Uu reference point is transported over the PC5 reference point as Ethernet or Unstructured traffic.

5. For IP PDU Session Type and IP traffic over PC5 reference point, IPv6 prefix or IPv4 address (including NAT case) is allocated for the 5G ProSe Layer-3 Remote UE as defined in clause 5.5.1.3.
6. The 5G ProSe Layer-3 Remote UE may provide the PC5 QoS rule to the 5G ProSe Layer-3 UE-to-Network Relay using Layer-2 link modification procedure as specified in clause 6.4.3.4. The 5G ProSe Layer-3 UE-to-Network Relay generates the Packet Filters used over Uu interface based on the received PC5 QoS Rule(s) as described in clause 5.6.2.1, and may perform the UE requested PDU Session Modification as defined in TS 23.502 [5] clause 4.3.3 to setup a new QoS Flow or bind the traffic to an existing QoS Flow.

From this point the uplink and downlink relaying can start. For downlink traffic forwarding, the PC5 QoS Rule is used to map the downlink packet to the PC5 QoS Flow. For uplink traffic forwarding, the 5G QoS Rule is used to map the uplink packet to the Uu QoS Flow.

7. The 5G ProSe Layer-3 UE-to-Network Relay shall send a Remote UE Report (Remote User ID, Remote UE info) message to the SMF for the PDU Session associated with the relay. The Remote User ID is an identity of the 5G ProSe Layer-3 Remote UE user (provided via User Info) that was successfully connected in step 4. The Remote UE info is used to assist identifying the 5G ProSe Layer-3 Remote UE in the 5GC. For IP PDU Session Type, the Remote UE info is Remote UE IP info. For Ethernet PDU Session Type, the Remote UE info is Remote UE MAC address which is detected by the 5G ProSe Layer-3 UE-to-Network Relay. For Unstructured PDU Session Type, the Remote UE info is not included. The SMF stores the Remote User IDs and the related Remote UE info in the 5G ProSe Layer-3 UE-to-Network Relay's SM context for this PDU Session associated with the relay.

The Remote UE Report is N1 SM NAS message sent with the PDU Session ID to the AMF, in turn delivered to the SMF.

NOTE 2: The privacy protection for Remote User ID depends on SA WG3 design.

For IP info the following principles apply:
for IPv4, the 5G ProSe Layer-3 UE-to-Network Relay shall report TCP/UDP port ranges assigned to individual 5G ProSe Layer-3 Remote UE(s) (along with the Remote User ID);
for IPv6, the 5G ProSe Layer-3 UE-to-Network Relay shall report IPv6 prefix(es) assigned to individual 5G ProSe Layer-3 Remote UE(s) (along with the Remote User ID).

If the PDU Session for relaying is released by the UE-to-Network Relay or the network as described in clause 4.3.4 of TS 23.502 [5], the UE-to-Network Relay should initiate the release of the layer-2 links associated with the released PDU Session using the procedure defined in clause 6.4.3.3.

The 5G ProSe Layer-3 UE-to-Network Relay shall send the Remote UE Report message when the 5G ProSe Layer-3 Remote UE disconnects from the 5G ProSe Layer-3 UE-to-Network Relay (e.g. upon explicit layer-2 link release or based on the absence of keep alive messages over PC5) to inform the SMF that the 5G ProSe Layer-3 Remote UE(s) have left.

NOTE 3: In order for the SMF to have the 5G ProSe Layer-3 Remote UE(s) information, the HPLMN and the VPLMN where the 5G ProSe Layer-3 UE-to-Network Relay is authorised to operate, needs to support the transfer of the 5G ProSe Layer-3 Remote UE related parameters if the SMF is in the HPLMN.

It is up to 5G ProSe Layer-3 UE-to-Network Relay implementation how PDU Session(s) used for relaying are released or QoS Flow(s) used for relaying are removed by the 5G ProSe Layer-3 UE-to-Network Relay when 5G ProSe Layer-3 Remote UE(s) disconnect from the 5G ProSe Layer-3 UE-to-Network Relay.

6.5.2 5G ProSe Communication Via 5G ProSe Layer-2 UE-to-Network Relay 6.5.2.1 Registration and Connection Management 6.5.2.1.1 Registration Management Registration Management for the 5G ProSe Layer-2 Remote UE and the 5G ProSe Layer-2 UE-to-Network Relay follows the principles and procedures defined in TS 23.501 [4] and TS 23.502 [5]. The 5G ProSe Layer-2 Remote UE and the 5G ProSe Layer-2 UE-to-Network Relay may be served by the same AMF or different AMFs.

6.5.2.1.2 Connection Management

Connection Management for the 5G ProSe Layer-2 Remote UE and the 5G ProSe Layer-2 UE-to-Network Relay follows the principles and procedures defined in TS 23.501 [4] and TS 23.502 [5] with the following modifications.

The 5G ProSe Layer-2 UE-to-Network Relay may only relay data/signalling for the 5G ProSe Layer-2 Remote UE(s) when the 5G ProSe Layer-2 UE-to-Network Relay is in CM-CONNECTED state. If the 5G ProSe Layer-2 UE-to-Network Relay is in CM_IDLE state and receives a connection request from the 5G ProSe Layer-2 Remote UE for relaying, the 5G ProSe Layer-2 UE-to-Network Relay shall trigger Service Request procedure to enter CM_CONNECTED state before relaying the 5G ProSe Layer-2 Remote UEs traffic.

The state of 5G ProSe UE-to-Network Relay is controlled by NG-RAN with the following:

If any 5G ProSe Layer-2 Remote UE connected to the 5G ProSe Layer-2 UE-to-Network Relay is in CM-CONNECTED with RRC Connected state, the 5G ProSe Layer-2 UE-to-Network Relay should remain CM-CONNECTED state with RRC Connected state.

If all 5G ProSe Layer-2 Remote UEs connected to the 5G ProSe Layer-2 UE-to-Network Relay enter CM-IDLE or CM-CONNECTED with RRC Inactive state, the 5G ProSe Layer-2 UE-to-Network Relay may enter CM-IDLE state or CM-CONNECTED with RRC Inactive state.

When 5G ProSe Layer-2 Remote UE is in CM-CONNECTED state, the 5G ProSe Layer-2 UE-to-Network Relay and 5G ProSe Layer-2 Remote UE keep the PC5 link. When the 5G ProSe Remote UE is in CM-IDLE state, it may either release the PC5 link for relaying or not.

For paging a 5G ProSe Layer-2 Remote UE, it follows the principles and procedures defined in TS 23.501 [4] and TS 23.502 [5], and the paging message delivery from NG-RAN to 5G ProSe Layer-2 Remote UE is specified in TS 38.351 [28].

6.5.2.2 Connection Establishment

Figure 12:
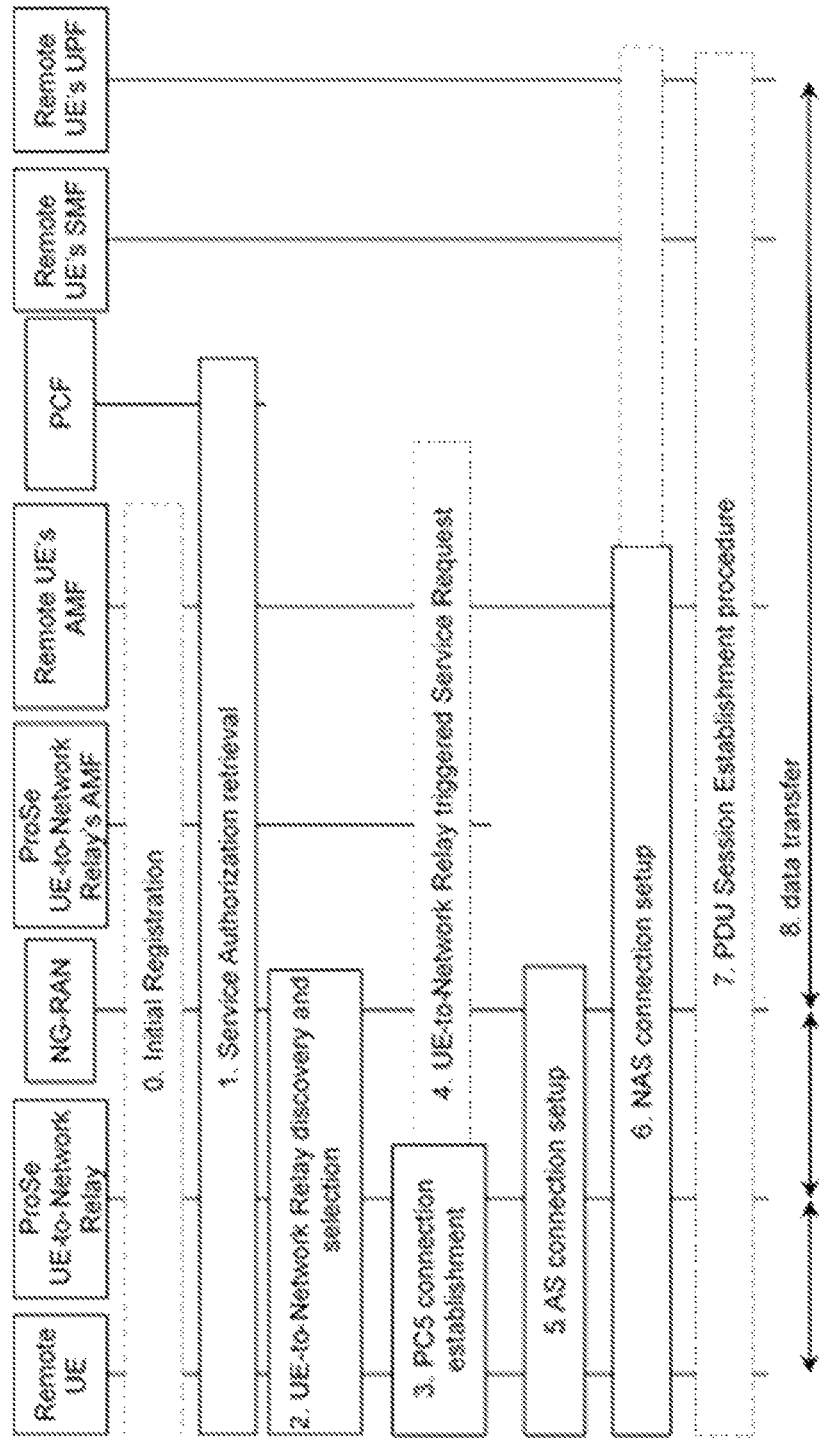
FIG. 12 is a reproduction of FIG. 6.5.2.1-1 of 3GPP TS 23.304 V1.1.0.

FIG. 6.5.2.1-1 of 3GPP TS 23.304 V1.1.0, Entitled "Connection Establishment for 5G ProSe Layer-2 UE-to-Network Relay", is Reproduced as FIG. 12

0. If in coverage, the 5G ProSe Layer-2 Remote UE and 5G ProSe Layer-2 UE-to-Network Relay may independently perform the initial registration to the network according to registration procedures in TS 23.502 [5].
1. If in coverage, the 5G ProSe Layer-2 Remote UE and 5G ProSe Layer-2 UE-to-Network Relay independently get the service authorization for 5G ProSe Layer-2 UE-to-Network Relay operation from the network. Service authorization and parameters provisioning for 5G ProSe Layer-2 UE-to-Network Relay operation are performed for the 5G ProSe Layer-2 UE-to-Network Relay and 5G ProSe Layer-2 Remote UE as specified in clause 5.1.4.

If the 5G ProSe Layer-2 Remote UE is not in coverage, the pre-configured parameters are used, and the service authorization and parameters may be updated after step 6.

If the 5G ProSe Layer-2 Remote UE has not performed Initial Registration, the 5G ProSe Layer-2 Remote UE may perform the Initial Registration in step 6.

2. The 5G ProSe Layer-2 Remote UE and 5G ProSe Layer-2 UE-to-Network Relay perform 5G ProSe UE-to-Network Relay Discovery and selection, as specified in clause 6.3.2.3.
3. The 5G ProSe Layer-2 Remote UE initiates a one-to-one communication connection with the selected 5G ProSe Layer-2 UE-to-Network Relay over PC5 using the procedure as described in clause 6.4.3.
4. If the 5G ProSe Layer-2 UE-to-Network Relay is in CM_IDLE state, triggered by the request received from the 5G ProSe Layer-2 Remote UE, the 5G ProSe Layer-2 UE-to-Network Relay performs Service Request procedure in the clause 4.2.3.2 of TS 23.502 [5].

Editor's note: How the ProSe UE-to-Network Relay is triggered to perform Service Request procedure requires cooperation with RAN2 and SA3 progress on mutual authentication during PC5 connection establishment.

5. The 5G ProSe Layer-2 Remote UE establishes an RRC Connection with the same NG-RAN serving the selected 5G ProSe Layer-2 UE-to-Network Relay, specified in TS 38.351 [28].
6. The 5G ProSe Layer-2 Remote UE sends a NAS message to the serving AMF. The NAS message is encapsulated in an Uu RRC message that is sent over PC5 to the 5G ProSe Layer-2 UE-to-Network Relay, and the 5G ProSe Layer-2 UE-to-Network Relay forwards the Uu RRC message to the NG-RAN specified in TS 38.351 [28]. NG-RAN selects the 5G ProSe Layer-2 Remote UE's serving AMF and forwards the NAS message to this AMF.

If 5G ProSe Layer-2 Remote UE has not performed the initial registration, the NAS message is an initial Registration message. Otherwise, the NAS message is either a service request message, or a mobility or periodic Registration message.

7. The 5G ProSe Layer-2 Remote UE may trigger the PDU Session Establishment procedure as defined in clause 4.3.2.2 of TS 23.502 [5].

8. The data is transferred between the 5G ProSe Layer-2 Remote UE and UPF via the 5G ProSe Layer-2 UE-to-Network Relay and NG-RAN. The 5G ProSe Layer-2 UE-to-Network Relay forwards all the data messages between the 5G ProSe Layer-2 Remote UE and NG-RAN, as specified in TS 38.351 [28].

3GPP TR 38.836 specifies control plane procedures for Layer-2 UE-to-Network Relay as follows:

4.5.5 Control Plane Procedure
4.5.5.1 Connection Management

Remote UE needs to establish its own PDU sessions/DRBs with the network before user plane data transmission.

PC5-RRC aspects of Rel-16 NR V2X PC5 unicast link establishment procedures can be reused to setup a secure unicast link between Remote UE and Relay UE for L2 UE-to-Network relaying before Remote UE establishes a Uu RRC connection with the network via Relay UE. For both in-coverage and out-of-coverage cases, when the Remote UE initiates the first RRC message for its connection establishment with gNB, the PC5 L2 configuration for the transmission between the Remote UE and the UE-to-Network Relay UE can be based on the RLC/MAC configuration defined in specifications.

The establishment of Uu SRB1/SRB2 and DRB of the Remote UE is subject to legacy Uu configuration procedures for L2 UE-to-Network Relay.

Figure 13:
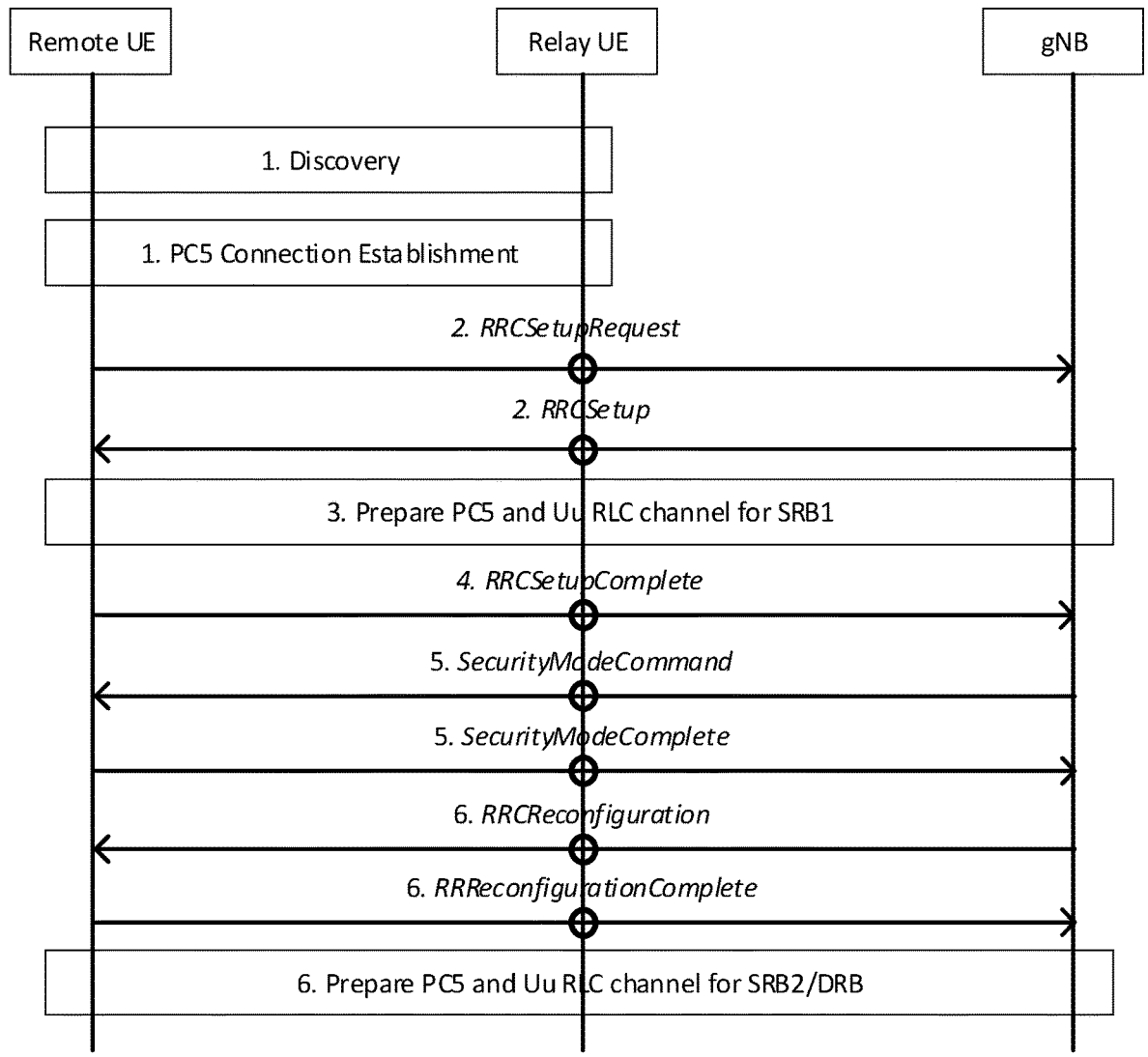
FIG. 13 is a reproduction of FIG. 4.5.5.1-1 of 3GPP TR 38.836 V17.0.0.

The following high level connection establishment procedure applies to L2 UE-to-Network Relay:

FIG. 4.5.5.1-1 of 3GPP TR 38.836 V17.0.0,
Entitled "Procedure for Remote UE Connection
Establishment", is Reproduced as FIG. 13

Step 1. The Remote and Relay UE perform discovery procedure, and establish PC5-RRC connection using the legacy Rel-16 procedure as a baseline.

Step 2. The Remote UE sends the first RRC message (i.e., RRCSetupRequest) for its connection establishment with gNB via the Relay UE, using a default L2 configuration on PC5. The gNB responds with an RRCSetup message to Remote UE. The RRCSetup delivery to the Remote UE uses the default configuration on PC5. If the Relay UE had not started in RRC_CONNECTED, it would need to do its own connection establishment upon reception of a message on the default L2 configuration on PC5. The details for Relay UE to forward the RRCSetupRequest/RRCSetup message for Remote UE at this step can be discussed in WI phase.

Step 3. The gNB and Relay UE perform relaying channel setup procedure over Uu. According to the configuration from gNB, the Relay/Remote UE establishes an RLC channel for relaying of SRB1 towards the Remote UE over PC5. This step prepares the relaying channel for SRB1.

Step 4. Remote UE SRB1 message (e.g. an RRCSetupComplete message) is sent to the gNB via the Relay UE using SRB1 relaying channel over PC5. Then the Remote UE is RRC connected over Uu.

Step 5. The Remote UE and gNB establish security following legacy procedure and the security messages are forwarded through the Relay UE.

Step 6. The gNB sets up additional RLC channels between the gNB and Relay UE for traffic relaying. According to the configuration from gNB, the Relay/Remote UE sets up additional RLC channels between the Remote UE and Relay UE for traffic relaying. The gNB sends an RRCReconfiguration to the Remote UE via the Relay UE, to set up the relaying SRB2/DRBs. The Remote UE sends an RRCReconfigurationComplete to the gNB via the Relay UE as a response. Besides the connection establishment procedure, for L2 UE-to-Network relay:

The RRC reconfiguration and RRC connection release procedures can reuse the legacy RRC procedure, with the message content/configuration design left to WI phase.

The RRC connection re-establishment and RRC connection resume procedures can reuse the legacy RRC procedure as baseline, by considering the above connection establishment procedure of L2 UE-to-Network Relay to handle the relay specific part, with the message content/configuration design left to WI phase.

4.5.5.2 Paging

The Option 2 as studied in TR36.746 [7] for FeD2D paging is selected as the baseline paging relaying solution for L2 UE-to-Network relaying case (i.e. Relay UE monitors the Remote UE's Paging Occasion(s) in addition to its own Paging Occasion(s).). The paging relaying solution applies to both CN paging and RAN paging via the Option 2.

3GPP R2-2108924 specifies protocol architecture and switching from direct to indirect path procedure for Layer-2 UE-to-Network Relay as follows:

16.x.2 Protocol Architecture
16.x.2.1 L2 UE-to-Network Relay

Figure 16:
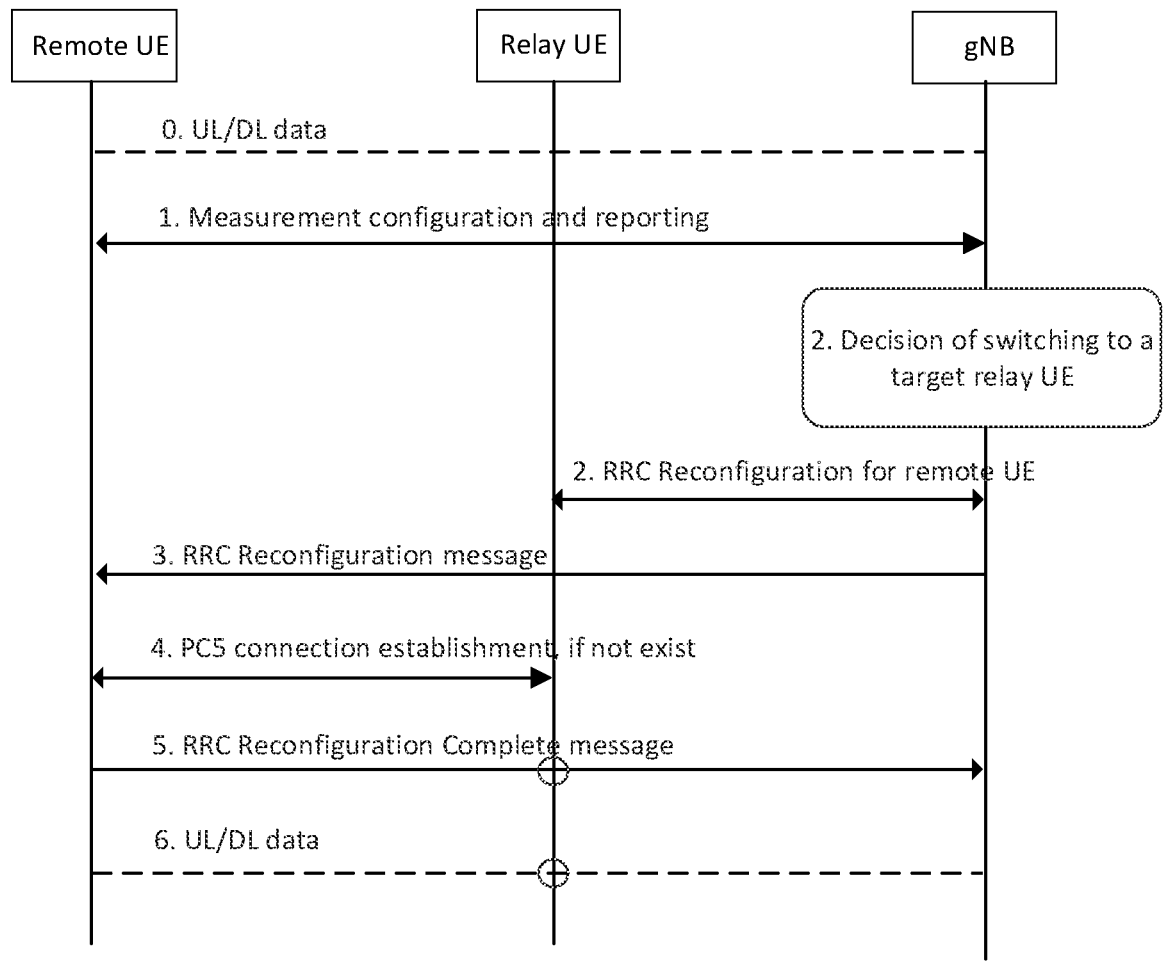
FIG. 16 is a reproduction of FIG. 16.x.6.2-1 of 3GPP R2-2108924.

The protocol stacks for the user plane and control plane of L2 U2N Relay architecture are described in FIG. 16.x.2.1-1 and FIG. 16.x.2.1-2. For L2 U2N Relay, the adaptation layer is placed over RLC sublayer for both CP and UP at both PC5 interface and Uu interface. The Uu SDAP/PDCP and RRC are terminated between U2N Remote UE and gNB, while RLC, MAC and PHY are terminated in each link (i.e. the link between U2N Remote UE and U2N Relay UE and the link between U2N Relay UE and the gNB).

Figure 14:
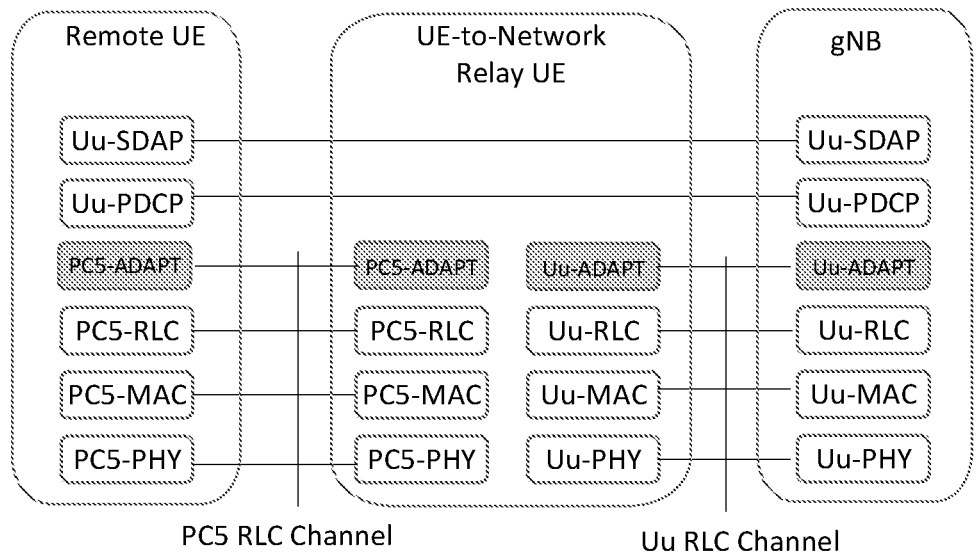
FIG. 14 is a reproduction of FIG. 16.x.2.1-1 of 3GPP R2-2108924.

FIG. 16.x.2.1-1 of 3GPP R2-2108924, Entitled
"User Plane Protocol Stack for L2 UE-to-Network
Relay", is Reproduced as FIG. 14

Figure 15:
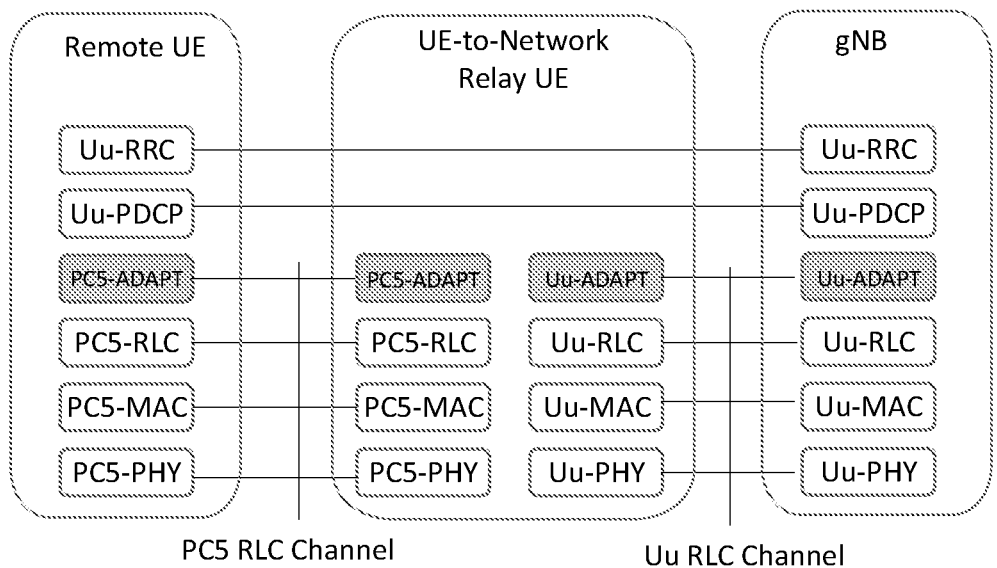
FIG. 15 is a reproduction of FIG. 16.x.2.1-2 of 3GPP R2-2108924.

FIG. 16.x.2.1-2 of 3GPP R2-2108924, Entitled
"Control Plane Protocol Stack for L2
UE-to-Network Relay", is Reproduced as FIG. 15

Editor's Note: The name of PC5 adapation layer and Uu adapation layer are not decided yet, and then currently PC5-ADAPT and Uu-ADAPT are used.

For L2 U2N Relay, for Uplink

The Uu adaptation layer supports UL bearer mapping between ingress PC5 RLC channels for relaying and egress Uu RLC channels over the Relay UE Uu interface. For uplink relaying traffic, the different end-to-end RBs (SRB, DRB) of the same Remote UE and/or different Remote UEs can be subject to N:1 mapping and data multiplexing over one Uu RLC channel.

The Uu adaptation layer supports Remote UE identification for the UL traffic (multiplexing the data coming from multiple Remote UE). The identity information of Remote UE Uu Radio Bearer and a local Remote UE ID is included in the Uu adaptation layer at UL in order for gNB to correlate the received packets for the specific PDCP entity associated with the right Remote UE Uu Radio Bearer of a Remote UE.

For L2 U2N Relay, for Downlink

The Uu adaptation layer supports DL bearer mapping at gNB to map end-to-end Radio Bearer (SRB, DRB) of Remote UE into Uu RLC channel over Relay UE Uu interface. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu interface.

The Uu adaptation layer supports Remote UE identification for Downlink traffic. The identity information of Remote UE Uu Radio Bearer and a local Remote UE ID needs be put into the Uu adaptation layer by gNB at DL in order for Relay UE to map the received packets from Remote UE Uu Radio Bearer to its associated PC5 RLC channel.

For L2 U2N Relay, the adaptation layer over PC5 is only for the purpose of bearer mapping.

Adaptation layer is not present over PC5 hop for relaying the U2N Remote UE's message on BCCH and PCCH.

For U2N Remote UE's message on SRB0, the Adaptation layer is not present over PC5 hop, but the adaptation layer is present over Uu hop for both DL and UL.

16.x.6.2 Switching from Direct to Indirect Path

For service continuity of L2 U2N Relay, the following procedure is used, in case of a UE switching to U2N Relay UE:

FIG. 16.x.6.2-1 of 3GPP R2-2108924, Entitled "Procedure for U2N Remote UE Switching to Indirect Relay UE", is Reproduced as FIG. 16

1. The U2N Remote UE reports one or multiple candidate U2N Relay UE(s) and legacy Uu measurements, after it measures/discovers the candidate U2N Relay UE(s).

The UE may filter the appropriate U2N Relay UE(s) according to Relay selection criteria before reporting. The UE shall report only the U2N Relay UE candidate (s) that fulfil the higher layer criteria.

The reporting can include at least U2N Relay UE ID, U2N Relay UE's serving cell ID, and SD-RSRP information.

2. The gNB decides to switch the U2N Remote UE to a target U2N Relay UE. Then the gNB sends an RRCReconfiguration message to the target U2N Relay UE, which can include at least Uu and PC5 RLC configuration for relaying, and bearer mapping configuration.

Editor's Note: At step 2, the gNB may decide to perform a normal handover rather than a path switch to an indirect path.

3. The gNB sends the RRCReconfiguration message to the U2N Remote UE. The contents in the RRCReconfiguration message can include at least U2N Relay UE ID, PC5 RLC configuration for relay traffic and the associated end-to-end radio bearer(s). The U2N Remote UE stops UP and CP transmission over Uu after reception of RRCReconfiguration message from the gNB.

4. The U2N Remote UE establishes PC5 connection with target U2N Relay UE

5. The U2N Remote UE completes the path switch procedure by sending the RRCReconfigurationComplete message to the gNB via the Relay UE.

6. The data path is switched from direct path to indirect path between the U2N Remote UE and the gNB.

Editor's Note: FFS in case the target relay UE is in IDLE/INACTIVE, if supported.

The UE-to-Network relay is supported in NR Release 17 to enable coverage extension and power saving for the remote UE. In other words, a UE-to-Network relay UE may be used to support communication between a remote UE and the network in case the remote UE cannot access the network directly or the communication path between the remote UE and the network is poor. There are two different types of solutions for UE-to-Network relay, including a Layer-2 (based) UE-to-Network relay and a Layer-3 (based) UE-to-Network relay.

According to 3GPP TS 23.304, both Model A discovery and Model B discovery are supported for the remote UE to discover a UE-to-Network Relay. Model A uses a single discovery protocol message (i.e. UE-to-Network Relay Discovery Announcement) and Model B uses two discovery protocol messages (i.e. UE-to-Network Relay Discovery Solicitation and UE-to-Network Relay Discovery Response). The UE-to-Network Relay Discovery Announcement message/UE-to-Network Relay Discovery Response message transmitted by a relay UE may include an Announcer Info/Discoveree Info (i.e. User Info ID) of the relay UE and a Relay Service Code (RSC) associated with the connectivity service for which the UE-to-Network Relay provides traffic relaying service to the Remote UE. The UE-to-Network Relay Discovery Solicitation message transmitted by the remote UE may include a Discoverer Info (i.e. User Info ID) of the remote UE and the Relay Service Code (RSC) associated with the connectivity service. The User Info ID of the relay UE/remote UE and the RSC may be preconfigured to the relay UE/remote UE for each connectivity service. Besides, both relay UE and remote UE may also be preconfigured with a UE-to-Network Relay Layer Indicator used to indicate whether a particular RSC is offering 5G ProSe Layer-2 or Layer-3 UE-to-Network Relay service.

In case there are multiple relay UEs in proximity of the remote UE, one of the relay UEs will be selected. After selecting a suitable relay UE, the remote UE may then establish a PC5 unicast link (or PC5 RRC connection) with the relay UE to support UE-to-Network Relay operation. The remote UE may transmit a Direct Communication Request message to the relay UE and the Direct Communication Request message may include a User Info ID (or Source User Info) of the remote UE, a User Info ID (or Target User Info) of the relay UE, and the RSC of the concerned connectivity service. The relay UE may then reply a Direct Communication Accept message to the relay UE and the Direct Communication Accept message may include the User Info ID (or Source User Info) of the relay UE. It is noted that in a PC5 unicast link establishment procedure applied for a ProSe direct communication (i.e. no UE-to-Network relay is involved), a ProSe Service Info (or ProSe identifier) instead of a RSC is included in the Direct Communication Request message.

To access the concerned connectivity service from a data network (DN), a PDU session should be established with the DN using an S-NSSAI and a DNN associated with the PDU session. In the Layer-2 UE-to-Network Relay solution, the remote UE establishes a PDU session with the DN via the relay UE, while the relay UE establishes the PDU session with the DN for the remote UE in the Layer-3 UE-to-Network Relay solution.

According to Section 6.4.3.6 of 3GPP TS 23.304, a 5G ProSe Remote UE and a 5G ProSe UE-to-Network Relay shall set up a separate PC5 unicast links if an existing unicast link(s) was established with a different Relay Service Code or without a Relay Service Code (i.e. ProSe direct communication). In other words, different PC5 unicast links should be established to support different connectivity services provided via a UE-to-Network Relay. This limitation may be fine in case a Layer-3 UE-to-Network Relay is concerned. However, the limitation may not be necessary if a Layer-2 UE-to-Network Relay is concerned because it should be feasible for the remote UE to establish multiple PDU sessions over the PC5 unicast link established between the remote UE and the relay UE, considering that currently one PC5 unicast link already can support multiple services. In other words, multiple connectivity services established via a Layer-2 UE-to-Network relay may share the same PC5 unicast link between the remote UE and the relay UE. And, each connectivity service corresponds to a PDU session.

Accordingly, a remote UE could establish a PC5 unicast link with a UE-to-Network relay UE, wherein the PC5 unicast link can support multiple connectivity services provided by more than one data network if the UE-to-Network relay UE is a Layer-2 UE-to-Network relay and the PC5 unicast link can support only one connectivity service provided by a data network if the UE-to-Network relay UE is a Layer-3 UE-to-Network relay.

To fulfil the above concept, it does not seem necessary to define one RSC for each connectivity service provided via a Layer-2 UE-to-Network Relay. Instead, one RSC preconfigured to the relay UE/remote UE may be used for supporting multiple (or all) connectivity services. Since the specific RSC may indicate the Layer-2 UE-to-Network Relay service(s) and other RSC's may indicate the Layer-3 UE-to-Network Relay services, the UE-to-Network Relay Layer Indicator preconfigured to indicate whether a particular RSC is offering 5G ProSe Layer-2 or Layer-3 UE-to-Network Relay service may not be needed anymore. Similarly, one User Info ID of the relay UE/remote UE may be preconfigured to the relay UE/remote UE to support multiple (or all) connectivity services provided via a Layer-2 UE-to-Network Relay.

Figure 17:
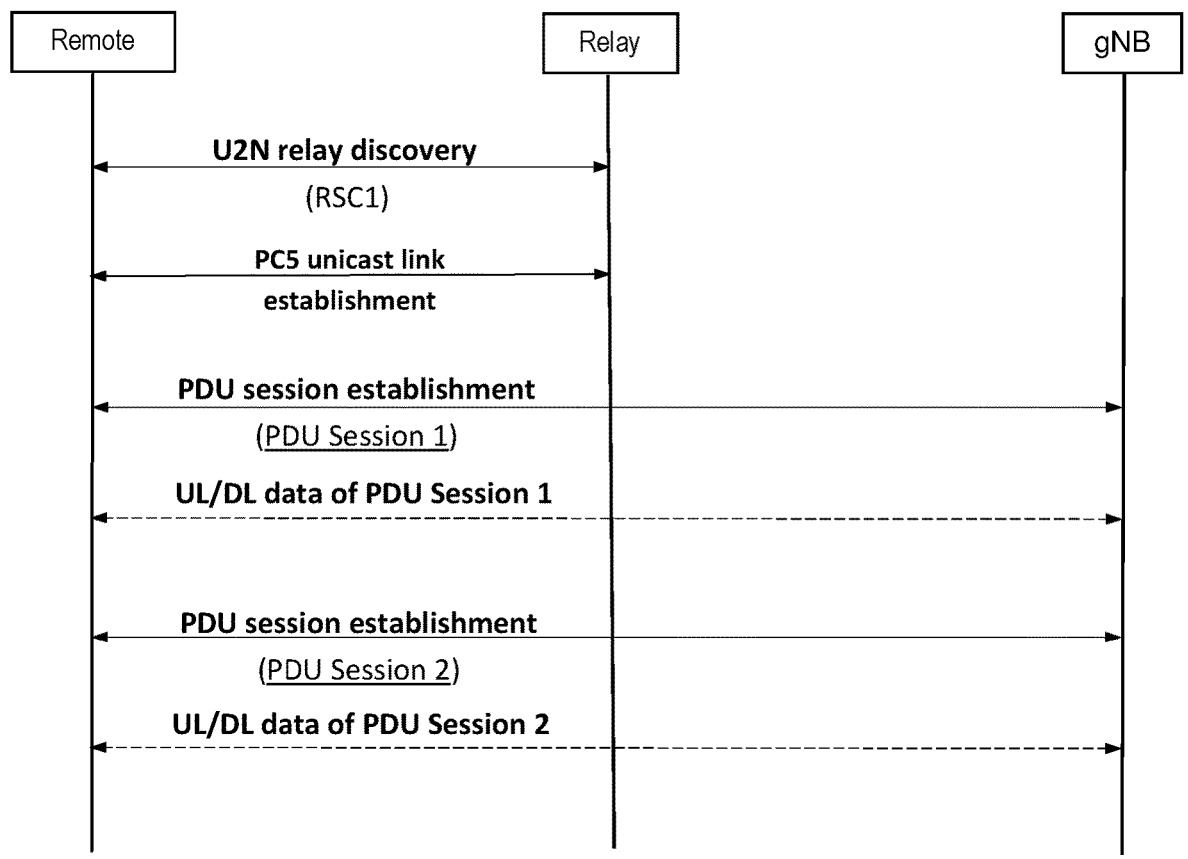
FIG. 17 illustrates an example of Layer-2 UE-to-Network (L2 U2N) Relay operations to support multiple connectivity services according to one exemplary embodiment of the invention.

FIG. 17 illustrates an example of L2 U2N Relay operations to support multiple connectivity services according to one embodiment of the invention. In FIG. 17, RSC1 could be used for U2N relay discovery and PC5 unicast link establishment. After the PC5 unicast link has been established between the remote UE and the Layer-2 UE-to-Network Relay, the remote UE may then establish PDU session-1 (corresponding to connectivity service-1) with data network-1 and PDU session-2 (corresponding to connectivity service-2) with data network-2 via the gNB.

Alternatively, it is also feasible not to define any RSC for connectivity services provided via a Layer-2 UE-to-Network Relay. With this, the presence of the field of RSC in a UE-to-Network Relay Discovery message could be optional. If the field of RSC is present, it indicates a Layer-3 UE-to-Network Relay service. Otherwise (i.e. the field of RSC is not present), it indicates a Layer-2 UE-to-Network Relay service. In one embodiment, one User Info ID of the relay UE/remote UE may be preconfigured to the relay UE/remote UE to support multiple (or all) connectivity services provided via a Layer-2 UE-to-Network Relay.

According to 3GPP TR 38.836, a Layer-2 UE-to-Network Relay needs to monitor the remote UE's Paging Occasion(s) and forward the received Paging message to the remote UE so that the remote UE can receive a terminating call. It is possible that the remote UE may want to connect with a Layer-2 UE-to-Network Relay for receiving the Paging message when it is out of coverage of the network. In this case, there is no specific connectivity service involved. The above-mentioned solutions enable the remote UE to establish a PC5 unicast link with a Layer-2 UE-to-Network Relay without activating any specific connectivity service (or PDU session). This is another motivation of the above solutions. After the PC5 unicast link with a Layer-2 UE-to-Network Relay is established for receiving Paging messages, the remote UE may then establish a PDU session for accessing a specific connectivity service over the PC5 unicast link.

Alternatively, a RSC corresponding to a connectivity service of voice call may be used in the UE-to-Network Relay Discovery message and/or the Direct Communication Request message for supporting paging message forwarding/reception. The PDU session associated with a voice call may be established with an IP Multimedia Subsystem (IMS) in the network, as discussed in 3GPP TS 23.228.

3GPP R2-2108924 specifies switching from direct to indirect path procedure for Layer-2 UE-to-Network (U2N) Relay. Basically, a remote UE needs to perform measurements and report the measurement results to gNB when it directly connects with the gNB for accessing connectivity services via PDU sessions established between the remote UE and the network. The measurement report may include candidate UE-to-Network Relay UEs for gNB to determine the target relay UE(s) for path switching when necessary. If gNB decides to switch the Remote UE to a target U2N Relay UE, gNB would send an RRCReconfiguration message to the target U2N Relay UE, which may include at least Uu and PC5 RLC configuration for relaying, and bearer mapping configuration. gNB would also send another RRCReconfiguration message to the U2N Remote UE. The content in the RRCReconfiguration message may include at least U2N Relay UE ID, PC5 RLC configuration for relay traffic and the associated end-to-end radio bearer(s).

There may be multiple connectivity services (or multiple PDU sessions) active in the remote UE before switching to indirect path. According to Section 6.4.3.6 of 3GPP TS 23.304, a 5G ProSe Remote UE and a 5G ProSe UE-to-Network Relay shall set up a separate PC5 unicast links if an existing unicast link(s) was established with a different Relay Service Code. In other words, different PC5 unicast links should be established to support different connectivity services provided via a UE-to-Network Relay. Besides, a relay UE may not support all connectivity services active in the remote UE. How to perform path switching in case of multiple connectivity services (or multiple PDU sessions) active in the Remote UE before switching to indirect path should be considered.

For simplicity, one potential solution is to use only one relay UE for path switching. In this situation, there is a need for gNB to know which connectivity services (or PDU sessions) are supported by the concerned relay UE so that gNB can configure the relay UE properly for path switching. For example, the remote UE may provide information in a measurement report to indicate the connectivity service(s) or PDU session(s) supported by each relay UE included in the measurement report. Then, gNB can select a relay UE for path switching and transmit a RRC Reconfiguration message to the relay UE and the RRC Reconfiguration message may include configurations for at least one Uu RLC bearer and at least one PC5 (or SL) RLC bearer to support relaying of the switched connectivity services (or PDU sessions). gNB may also transmit another RRC Reconfiguration message to the remote UE and this RRC Reconfiguration message may include configurations for at least one Uu radio bearer (i.e. end-to-end radio bearer) and at least one PC5 (or SL) RLC bearer to support relaying of the switched connectivity services (or PDU sessions). Here, one or more than one connectivity service (or PDU session) may be switched. The RRC Reconfiguration message may also include information to indicate the relay UE. In case more than one connectivity service (or PDU session) is considered for path switching, two unicast links may be established between the remote UE and the relay UE relaying of the switched connectivity services (or PDU sessions).

Alternatively, it is also feasible for the relay UE (rather than the remote UE) to provide information to indicate the connectivity service(s) or PDU session(s) which it supports to gNB beforehand.

It is possible that the selected relay UE may not be able to support all active connectivity services or PDU sessions in the remote UE. In this situation, a connectivity service (or PDU session) which is not considered during the path switching shall be discarded.

To maintain service continuity as possible, another potential solution is to use more than one relay UE for path switching. In this situation, the remote UE also needs to provide information in the measurement report to indicate the connectivity service(s) or PDU session(s) supported by each relay UE included in the measurement report. Then, gNB can determine the relay UEs for path switching and transmit one RRC Reconfiguration message to each relay UE. The RRC Reconfiguration message may include configurations for at least one Uu RLC bearer and at least one PC5 (or SL) RLC bearer to support relaying of the concerned connectivity services (or PDU sessions). gNB may also transmit another RRC Reconfiguration message to the remote UE, wherein this RRC Reconfiguration message may include configurations for at least two Uu radio bearers and at least two PC5 (or SL) RLC bearers to support the switched connectivity services (or PDU sessions). The RRC Reconfiguration message may also include information to indicate each relay UE associated with the configurations used for each connectivity service (or PDU session).

It is possible that the remote UE may not be able to find sufficient relay UEs which can support all active connectivity services or PDU sessions in the remote UE. In this situation, a connectivity service (or PDU session) which is not considered during the path switching shall be discarded.

Figure 18:
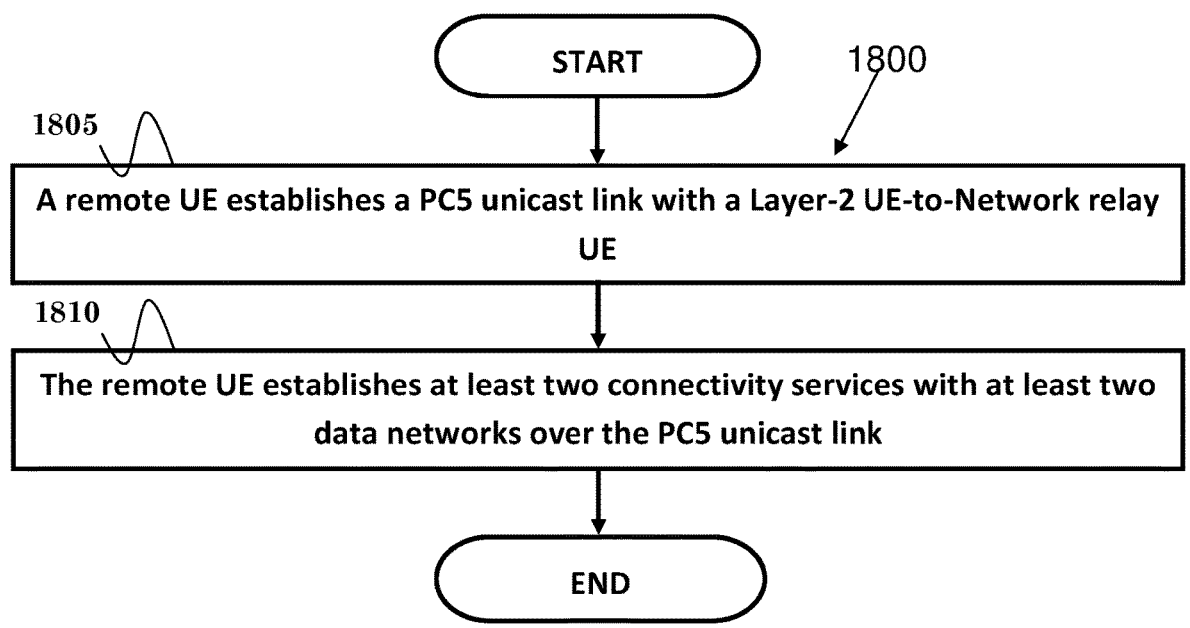
FIG. 18 is a flow chart according to one exemplary embodiment.

FIG. 18 is a flow chart 1800 illustrating a method for supporting multiple connectivity services from the perspective of a remote UE. In step 1805, a remote UE establishes a PC5 unicast link with a Layer-2 UE-to-Network relay UE. In step 1810, the remote UE establishes at least two connectivity services with at least two data networks over the PC5 unicast link.

In one embodiment, the remote UE could be preconfigured with a Relay Service Code (RSC) which is used to support the at least two connectivity services. The RSC could be included in a UE-to-Network Relay Discovery Solicitation message for transmission. The RSC could be included in a Direct Communication Request message transmitted to the Layer-2 UE-to-Network relay UE for establishing the PC5 unicast link.

In one embodiment, the remote UE could be preconfigured with a User Info Identifier (ID) which is used to support the at least two connectivity services. The User Info ID could be included in the UE-to-Network Relay Discovery Solicitation message for transmission. The User Info ID could be included in the Direct Communication Request message.

In one embodiment, each connectivity service may correspond to a PDU session. The remote UE could establish another PC5 unicast link with a Layer-3 UE-to-Network relay UE, wherein the another PC5 unicast link can support only one connectivity service provided by a data network. The PC5 unicast link could be a Layer-2 link.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a PC5 unicast link with a Layer-2 UE-to-Network relay UE, and (ii) to establish at least two connectivity services with at least two data networks over the PC5 unicast link. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for supporting multiple connectivity services, comprising:
   a remote User Equipment (UE) establishes a PC5 unicast link with a Layer-2 UE-to-Network relay UE; and
   the remote UE establishes at least two connectivity services with at least two data networks over the PC5 unicast link.

2. The method of claim 1, wherein the remote UE is preconfigured with a Relay Service Code (RSC) which is used to support the at least two connectivity services.

3. The method of claim 2, wherein the RSC is included in a UE-to-Network Relay Discovery Solicitation message for transmission.

4. The method of claim 2, wherein the RSC is included in a Direct Communication Request message transmitted to the Layer-2 UE-to-Network relay UE for establishing the PC5 unicast link.

5. The method of claim 1, the remote UE is preconfigured with a User Info Identifier (ID) which is used to support the at least two connectivity services.

6. The method of claim 5, wherein the User Info ID is included in the UE-to-Network Relay Discovery Solicitation message for transmission.

7. The method of claim 5, wherein the User Info ID is included in the Direct Communication Request message.

8. The method of claim 1, wherein each connectivity service corresponds to a Protocol Data Unit (PDU) session.

9. The method of claim 1, further comprising:
   the remote UE establishes another PC5 unicast link with a Layer-3 UE-to-Network relay UE, wherein the another PC5 unicast link can support only one connectivity service provided by a data network.

10. The method of claim 1, wherein the PC5 unicast link is a Layer-2 link.

11. A remote User Equipment (UE) for supporting multiple connectivity services, comprising:
    a control circuit;
    a processor installed in the control circuit; and
    a memory installed in the control circuit and operatively coupled to the processor;
    wherein the processor is configured to execute a program code stored in the memory to cause the remote UE to:
       establish a PC5 unicast link with a Layer-2 UE-to-Network relay UE; and
       establish at least two connectivity services with at least two data networks over the PC5 unicast link.

12. The remote UE of claim 11, wherein the remote UE is preconfigured with a Relay Service Code (RSC) which is used to support the at least two connectivity services.

13. The remote UE of claim 12, wherein the RSC is included in a UE-to-Network Relay Discovery Solicitation message for transmission.

14. The remote UE of claim 12, wherein the RSC is included in a Direct Communication Request message transmitted to the Layer-2 UE-to-Network relay UE for establishing the PC5 unicast link.

15. The remote UE of claim 11, the remote UE is preconfigured with a User Info Identifier (ID) which is used to support the at least two connectivity services.

16. The remote UE of claim 15, wherein the User Info ID is included in the UE-to-Network Relay Discovery Solicitation message for transmission.

17. The remote UE of claim 15, wherein the User Info ID is included in the Direct Communication Request message.

18. The remote UE of claim 11, wherein each connectivity service corresponds to a Protocol Data Unit (PDU) session.

19. The remote UE of claim 11, wherein the processor is further configured to execute a program code stored in the memory to cause the remote UE to:
    establish another PC5 unicast link with a Layer-3 UE-to-Network relay UE, wherein the another PC5 unicast link can support only one connectivity service provided by a data network.

20. The remote UE of claim 11, wherein the PC5 unicast link is a Layer-2 link.

* * * * *